United States Patent [19]
Sekine et al.

[11] Patent Number: 6,067,193
[45] Date of Patent: May 23, 2000

[54] POLARIZATION DEVICE AND PROJECTION TYPE DISPLAY APPARATUS

[75] Inventors: Atsushi Sekine, Kasukabe; Hideaki Shimomura, Kawasaki; Tetsuo Hattori, Yokohama, all of Japan

[73] Assignee: Nikon Corporation, Tokyo, Japan

[21] Appl. No.: 09/172,264

[22] Filed: Oct. 14, 1998

[30] Foreign Application Priority Data

| Oct. 15, 1997 | [JP] | Japan | ................................. | 9-297866 |
| Oct. 15, 1997 | [JP] | Japan | ................................. | 9-297867 |
| Oct. 15, 1997 | [JP] | Japan | ................................. | 9-297868 |
| Nov. 10, 1997 | [JP] | Japan | ................................. | 9-323849 |

[51] Int. Cl.$^7$ ............................. G02B 5/30; G03B 21/14; G02F 1/1335
[52] U.S. Cl. .............................. 359/489; 353/20; 353/38; 349/5; 349/8
[58] Field of Search .................................. 353/20, 38, 31, 353/33, 34, 37; 349/5, 8, 9; 359/489

[56] References Cited

U.S. PATENT DOCUMENTS

| 5,841,581 | 11/1998 | Tutt | .......................................... | 359/489 |
| 5,865,521 | 2/1999 | Hashizume et al. | ....................... | 353/20 |

FOREIGN PATENT DOCUMENTS 08 304 739 A   11/1996   Japan .

*Primary Examiner*—Cassandra Spyrou
*Assistant Examiner*—Fayez Assaf
*Attorney, Agent, or Firm*—Pillsbury Madison & Sutro LLP

[57] ABSTRACT

A polarization device comprises: a light source; a first lens plate including a plurality of lenses in a planar configuration that divides light emitted from the light source into beams defined by apertures of the plurality of lenses; a second lens plate which is different from the first plate and includes a plurality of lenses in a planar configuration, the plurality of lenses of the first lens plate individually forming light spots at the plurality of lenses of the second lens plate; a polarization beam splitter array constituted of a plurality of polarization beam splitters provided continuously, that performs polarization splitting of light that has been emitted from the light spots of the plurality of lenses of the second lens plate and has entered therein to split the light into p-polarized light and s-polarized light, and emits the split light; and halfwave plates provided at an emission surface of the polarization beam splitter array that convert polarized light emitted from the polarization beam splitter array either from p-polarized light to s-polarized light or from s-polarized light to p-polarized light. And the halfwave plates are provided at the emission surface of the polarization beam splitter array, in different arrangements between a central area of the polarization beam splitter array and a peripheral area excluding the central area.

17 Claims, 19 Drawing Sheets

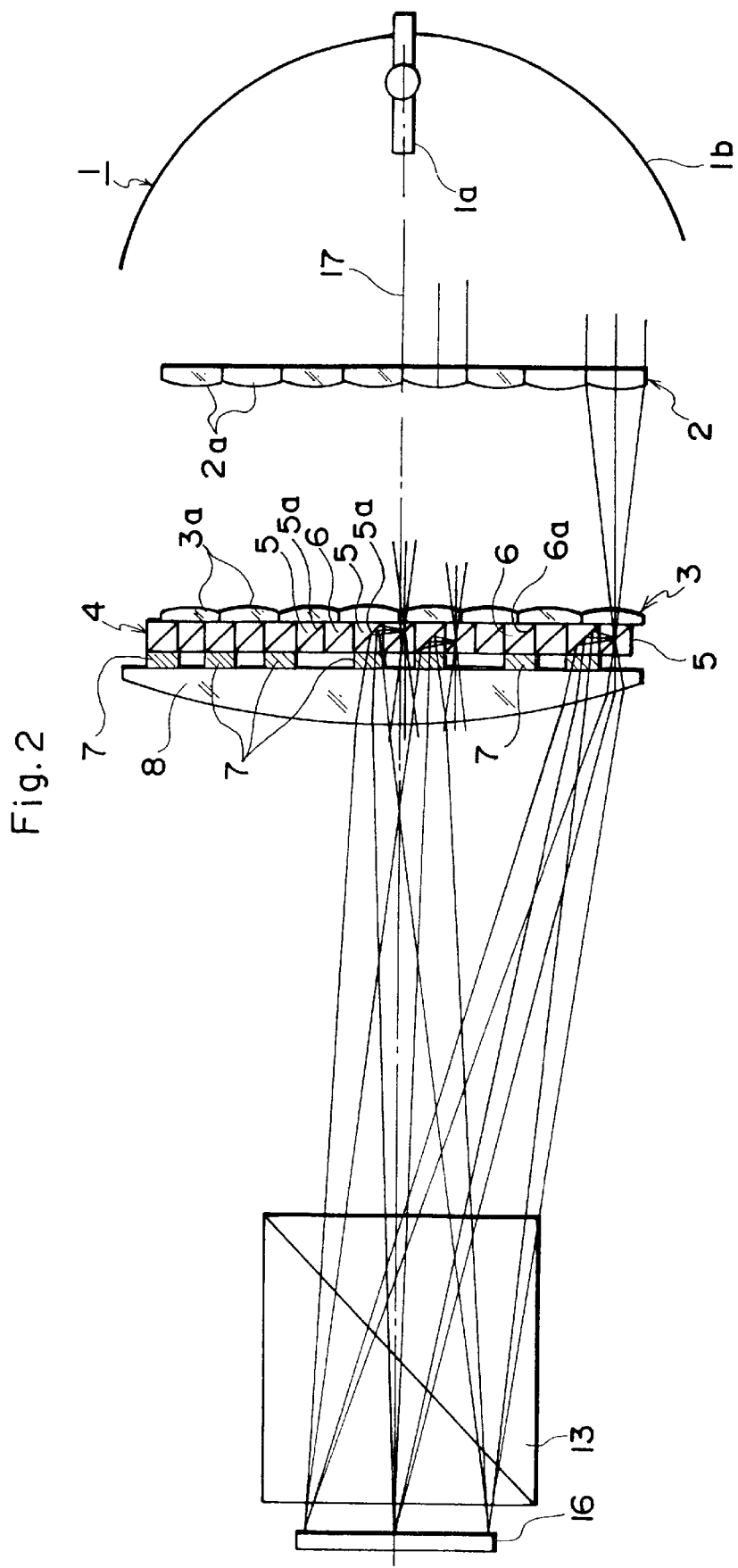

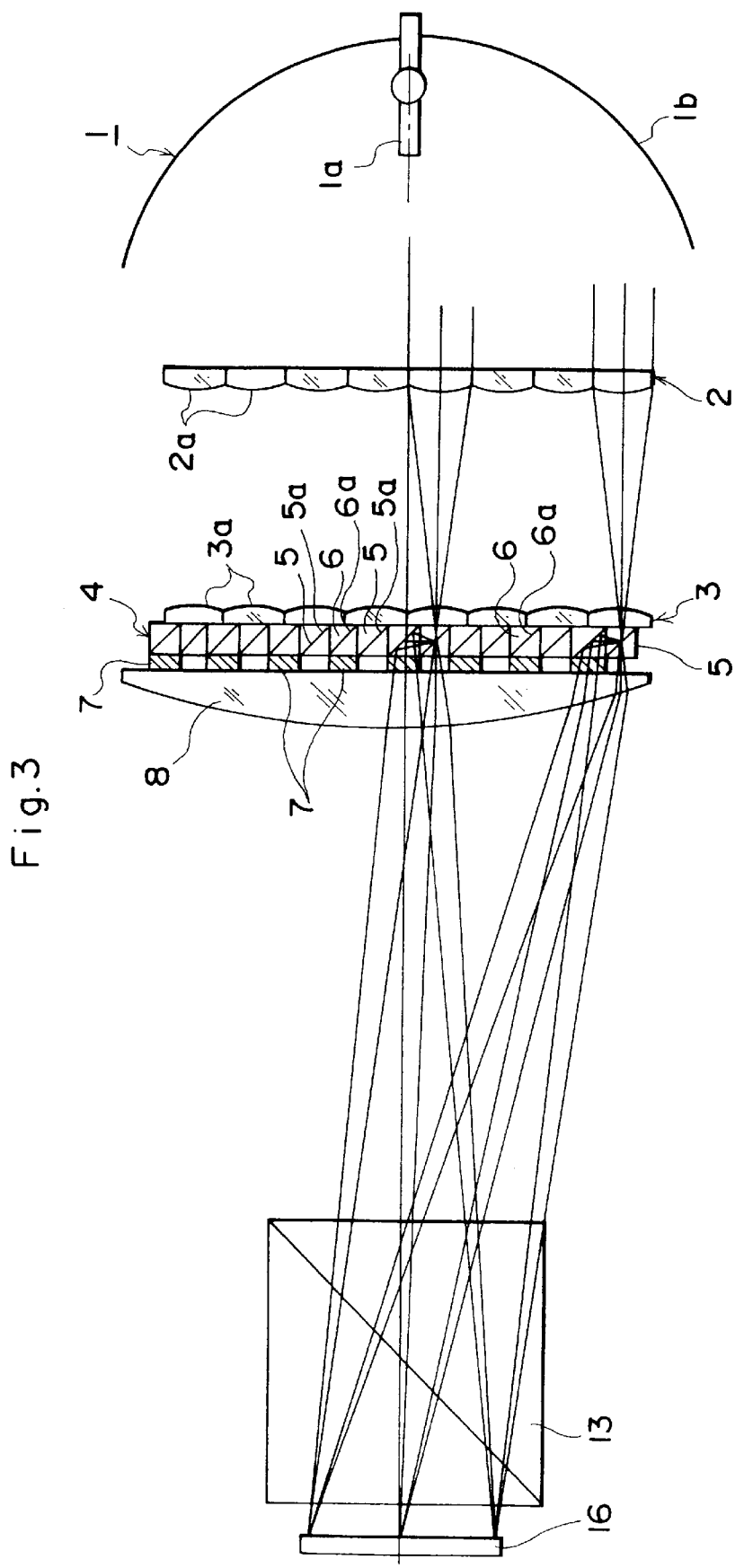

POLARIZATION DEVICE AND PROJECTION TYPE DISPLAY APPARATUS

INCORPORATION BY REFERENCE

The disclosures of the following priority applications are herein incorporated by reference:

Japanese Patent Application No. 9-297866 filed Oct. 15, 1997
Japanese Patent Application No. 9-297867 filed Oct. 15, 1997
Japanese Patent Application No. 9-297868 filed Oct. 15, 1997
Japanese Patent Application No. 9-323849 filed Nov. 10, 1997

BACKGROUND OF THE INVENTION

1. Field of the Invention

The present invention relates to a polarization device employed in a polarization illumination system for a liquid crystal light valve which is used in a projection type display apparatus, and a projection type display apparatus that projects modulated light emitted from the light valve illuminated by a polarization illumination system employing the polarization device on a screen as an image.

2. Description of the Related Art

An illumination system employing two lens plates, i.e., the so-called fly-eye lens plates, is used in a method for evenly illuminating a rectangular illumination area such as a liquid crystal light valve or the like in the known art.

In addition, a polarization illumination system, which improves the illuminating efficiency in the illumination system described above by disposing a polarization beam splitter array and halfwave plates at a specific position at the emission surface of the second lens plate of the two lens plates to improve the utilization efficiency of the light source light, and a projection type display apparatus employing this illumination system have been proposed (see Japan Laid-Open Patent Publication No. 8-304739 (PCT international publication No. WO 96/20422)).

FIG. 18 in this specification presents FIG. 8 in the above mentioned publication, which was used to explain the polarization device and the projection type display apparatus given as an example of a variation of the fifth embodiment in the publication.

In the example of the prior art in FIG. 18, a light source unit 102 comprises a light source lamp 100 and a parabolic reflector 101 constituted of a concave mirror such as a parabolic mirror, and beams emitted from the light source unit 102, which are almost parallel to one another, enter a first lens plate 104 constituted by providing a plurality of lenses 103 in a planar configuration. The light emitted from the first lens plate 104 enters a plurality of lenses 106 constituting a second lens plate 105. During this process, since the individual lenses 106 of the second lens plate 105 are formed in conformance to the shape of the lenses 103 of the first lens plate 104 and are provided at the focal points of the lenses 103, the light from the individual lenses 103 of the first lens plate 104 converges at the lenses 106 of the second lens plate 105.

In addition, a polarization beam splitter array (hereafter referred to as a PBS array) 108 comprising a plurality of polarization beam splitters (hereafter referred to as PBS's) 107 is provided at the emission surface of the second lens plate 105, and a halfwave plate 109 is provided at every other PBS 107 at the emission surface of the PBS array 108.

Furthermore, a condenser lens 110 is provided on the side where the emission surfaces of the halfwave plates 109 are present.

In the figure, the roughly parallel beams that have entered the lenses 103 of the first lens plate 104 are converged in the approximately central areas of the lenses 106 constituting the second lens plate 105, as described above, then are emitted from the lenses 106 to enter the PBS's 107 constituting the PBS array 108 and are transmitted through polarization splitter portions 107a provided diagonally at the PBS's 107 to undergo the process of polarization splitting in which the light is divided into p-polarized light that is directly emitted and s-polarized light that is reflected by the polarization splitter portions 107a of the PBS's 107 to enter adjacent PBS's 107. The s-polarized light entering the adjacent PBS's 107 is then reflected by the polarization splitter portions 107a of the PBS's 107 and is emitted in the direction matching that of the optical axis of the light that entered the lenses 106.

With the halfwave plates 109 provided at the emission surfaces of the PBS's 107 where the p-polarized light is emitted and the p-polarized light entering the halfwave plates 109 is converted to s-polarized light for emission. As a result, all the light from the light source that has entered the lens plates is emitted as s-polarized light.

The s-polarized light travels through the condenser lens 110 and then enters a light valve 111 to illuminate the light valve 111 with a high degree of efficiency.

It is clear that by adopting this structure, which is provided with the PBS array 108, the halfwave plates 109 and the like, lighting with a far higher degree of intensity is achieved in polarized illumination of the light valve 111 with the s-polarized light compared to an illumination system employing only the first lens plate 104 and the second lens plate 105.

In other words, in the method that only employs the first lens plate 104 and the second lens plate 105, and not the PBS array 108, since random light illuminates the light valve 111, only linearly polarized light in one direction in the random light is used as incident light entering the light valve 111.

However, the need for achieving a higher degree of intensity for projected images on projection type display apparatuses has been growing with ever increasing urgency in recent years.

In this regard, polarization illumination systems employing the prior art method are by no means satisfactory, as detailed later, and the inventor of the present invention et al. have conducted research by regarding such a polarization illumination system as an integrated polarization device which includes a light source unit, and observed that the original functions of the polarization device are not wholly fulfilled.

SUMMARY OF THE INVENTION

Accordingly, an object of the present invention is to achieve polarization illumination with an even higher degree of intensity (or luminance) by ensuring that the original functions of the method in the prior art are fully yielded.

Before describing the contents of the present invention, an analysis of the method in the prior art is first given.

FIG. 16 is an enlargement illustrating a portion of the polarization device employed in the method in the prior art described earlier (see Japan Laid-Open Patent Publication No. 8-304739). The figure shows the first lens plate 104, the second lens plate 105, the PBS array 108 and the halfwave plate 109. The polarization device in the figure is constituted through the concept that it includes the light source unit 102 in addition to the members listed above but does not include the condenser lens 110, whereas the polarization illumination system is constituted based upon the concept that it includes the condenser lens 110 in addition to the polarization device.

As illustrated in the figure, the light from the light source entering the first and second lens plates 104 and 105 in the vicinity of the optical axis 112 is converged at a lens 106X, as it is with the other lenses 106 of the second lens plate 105, to form a small light spot at the center of the lens 106X. The light spot in this context refers to an image of converged (or condensed) light from the light source achieved by the lenses 103 (a projected image of the light source or a secondary light source image).

However, the inventor of the present invention et al. have observed that the description of the prior art example (a small light spot is formed) is not accurate with respect to what happens at the center of the first lens plate 104 and the second lens plate 105, in that the light spot at the lens 106X in the central area of the second lens plate 105 ranges over the entire aperture (or opening) formed by the lens 106X.

This is understood to be the result of having a light source lamp 100 of a specific size at the central portion of the light source unit 102, and this factor is illustrated in FIG. 17. Namely, at a lens 103X provided in the central area of the first lens plate 104, beams do not enter parallel to the optical axis 112 but enter with a specific degree of inclination and, as a result, the beams that have entered the lens 103X then enter the corresponding lens 106X at the second lens plate 105 achieving a light spot ranging over the entire aperture constituted by the lens 106X.

In other words, the beams (1)–(3) in the figure, enter the lens 106X of the second lens plate 105 at its center and its circumferential edge. Because the number of beams entering the lens 103X of the first lens plate 104 at an angle relative to the optical axis 112 is also existing in addition to the number of beams entering the lens 103X parallel to the optical axis 112, the number of beams entering the circumferential edge of the lens 106X, indicated as (2) and (3), is also existing in addition to the number of beams entering the central area, indicated as (1).

Furthermore, some of the beams entering the circumferential edge of the lens 106X may enter the boundaries between the lenses 106.

The beams indicated as (1) enter the lens 106X near the optical axis 112 and are transmitted through the lens 106X to enter a PBS 107X and be split (or separated) into p-polarized light that is transmitted through a polarization splitter portion 107Xa, and s-polarized light that is reflected by the polarization splitter portion 107Xa to enter an adjacent PBS 107Y. This s-polarized light is then reflected by the polarization splitter portion 107Ya of the adjacent PBS 107Y and then emitted from the PBS 107Y. The p-polarized light, on the other hand, travels through a halfwave plate 109 provided at the emission surface of the PBS 107X to be converted to s-polarized light ((1)-S) and is ultimately emitted as s-polarized light.

Thus, the light valve 111 is illuminated by the s-polarized light.

While the beams indicated as (2) that have entered the circumferential edge of the lens 106X near the optical axis 112 then enter the PBS 107Y via the lens 106X, the p-polarized light that is emitted after being transmitted through the polarization splitter portion 107Ya of the PBS 107Y is emitted as p-polarized light ((2)-P) without any change since it does not pass through the halfwave plate 109. In addition, the s-polarized light reflected by the polarization splitter portion 107Ya of the PBS 107Y enters an adjacent PBS 107Z where it is reflected by a polarization splitter portion 107Za to be emitted from the PBS 107Z, and is then converted to p-polarized light by the halfwave plate 109 provided at its emission surface.

This p-polarized light is absorbed by a polarization plate (not shown) for transmitting s-polarized light constituting the light valve 111 and provided on the side where the incident light enters the light valve 111, and is, therefore, not employed as illuminating light for the light valve 111 and ultimately as projection light. The same principal applies to beams indicated as (3) entering the circumferential edge of the lens 106X in the vicinity of the optical axis 112.

Consequently, s-polarized light required as polarized light entering the light valve 111 is constituted only of the beams (1) entering the vicinity of the center of the lens 106X, while beams (2) and (3) entering the circumferential edge are emitted as p-polarized light and do not contribute to the illumination of the light valve 111. Thus, unnecessary p-polarized light beams (2) and (3) are generated from the area around the optical axis 112 of the second lens plate 105 (central area). Because of the p-polarized light which dies not contribute to the illumination of the light valve 111, the potential for achieving a higher degree of luminance of projected images is not wholly fulfilled in the projection type display apparatus disclosed in the publication on the prior art above.

It is to be noted that while the explanation above is given by using the lens 106X located on the optical axis 112 as an example, the same principal applies to the other lenses 106 located in the vicinity of the optical axis 112.

Furthermore, test results indicating that beams generated from a light spot ranging over a large area formed over the entire lens 106 around the optical axis at the second lens plate 105 account for a majority of beams generated from the entire second lens plate 105.

Next, the present invention, which has been completed based upon the analysis above in order to achieve the object described above, is explained.

A polarization device according to the present invention, comprises: a light source; a first lens plate including a plurality of lenses in a planar configuration that divides light emitted from the light source into beams defined by apertures of the plurality of lenses; a second lens plate which is different from the first plate and includes a plurality of lenses in a planar configuration, the plurality of lenses of the first lens plate individually forming light spots at the plurality of lenses of the second lens plate; a polarization beam splitter array constituted of a plurality of polarization beam splitters provided continuously, that performs polarization splitting of light that has been emitted from the light spots of the plurality of lenses of the second lens plate and has entered therein to split the light into p-polarized light and s-polarized light, and emits the split light; and halfwave plates provided at an emission surface of the polarization beam splitter array that convert polarized light emitted from the polarization beam splitter array either from p-polarized light to s-polarized light or from s-polarized light to p-polarized light. And the halfwave plates are provided at the emission surface of the polarization beam splitter array, in different arrangements between a central area of the polarization beam splitter array and a peripheral area excluding the central area.

A projection type display apparatus according to the present invention, comprises: a polarization device; a color separation optical system that separates p-polarized light or s-polarized light emitted from the polarization device into R light, G light and B light; light valves that are provided for the R light, G light and B light, modulate the separated R light, G light and B light with signals corresponding to the R light, G light and B light, and then emit modulated light, respectively; a detecting optical system that detects the modulated light from light emitted from the light valves; a composition optical system that performs color composition of detected light of the R light, G light and B light that has been detected at the detecting optical system; and a projection optical system that projects composite light obtained by the composition optical system. And the polarization device comprises: a light source; a first lens plate including a plurality of lenses in a planar configuration that divides light emitted from the light source into beams defined by apertures of the plurality of lenses; a second lens plate which is different from the first plate and includes a plurality of lenses in a planar configuration, the plurality of lenses of the first lens plate individually forming light spots at the plurality of lenses of the second lens plate; a polarization beam splitter array constituted of a plurality of polarization beam splitters provided continuously, that performs polarization splitting of light that has been emitted from the light spots of the plurality of lenses of the second lens plate and has entered therein to split the light into p-polarized light and s-polarized light, and emits the split light; and halfwave plates provided at an emission surface of the polarization beam splitter array that convert polarized light emitted from the polarization beam splitter array either from p-polarized light to s-polarized light or from s-polarized light to p-polarized light. The halfwave plates are provided at the emission surface of the polarization beam splitter array, in different arrangements between a central area of the polarization beam splitter array and a peripheral area excluding the central area.

Another polarization device according to the present invention, comprising: a light source; a first lens plate including a plurality of lenses in a planar configuration that divides light emitted from the light source into beams defined by apertures of the plurality of lenses; a second lens plate which is different from the first plate and includes a plurality of lenses in a planar configuration, the plurality of lenses of the first lens plate individually forming light spots at the plurality of lenses of the second lens plate; a polarization beam splitter array constituted of a plurality of polarization beam splitters provided continuously, that performs polarization splitting of light that has been emitted from the light spots of the plurality of lenses of the second lens plate and has entered therein to split the light into p-polarized light and s-polarized light, and emits the split light; and a halfwave plate provided at an emission surface of the polarization beam splitter array that converts polarized light emitted from the polarization beam splitter array either from p-polarized light to s-polarized light or from s-polarized light to p-polarized light. And none of the polarization beam splitters is provided in a central area of the polarization beam splitter array.

Another projection type display apparatus according to the present invention, comprising: a polarization device; a color separation optical system that separates p-polarized light or s-polarized light emitted from the polarization device into R light, G light and B light; light valves that are provided for the R light, G light and B light, modulate the separated R light, G light and B light with signals corresponding to the R light, G light and B light, and then emit modulated light, respectively; a detecting optical system that detects the modulated light from light emitted from the light valves; a composition optical system that performs color composition of detected light of the R light, G light and B light that has been detected at the detecting optical system; and a projection optical system that projects composite light obtained by the composition optical system. And the polarization device comprises: a light source; a first lens plate including a plurality of lenses in a planar configuration that divides light emitted from the light source into beams defined by apertures of the plurality of lenses; a second lens plate which is different from the first plate and includes a plurality of lenses in a planar configuration, the plurality of lenses of the first lens plate individually forming light spots at the plurality of lenses of the second lens plate; a polarization beam splitter array constituted of a plurality of polarization beam splitters, that performs polarization splitting of light that has been emitted from the light spots of the plurality of lenses of the second lens plate and has entered therein to split the light into p-polarized light and s-polarized light, and emits the split light; and a halfwave plate provided at an emission surface of the polarization beam splitter array that converts polarized light emitted from the polarization beam splitter array either from p-polarized light to s-polarized light or from s-polarized light to p-polarized light. None of the polarization beam splitters is provided in a central area of the polarization beam splitter array.

BRIEF DESCRIPTION OF THE DRAWINGS

FIG. 2 is a configuration diagram superimposed with a diagram of light beams, illustrating the polarization device in the first embodiment in a cross section through approximately the center;

FIG. 3 is a configuration diagram superimposed with a diagram of light beams, illustrating the polarization device in the first embodiment in a cross section through a peripheral area;

DESCRIPTION OF THE PREFERRED EMBODIMENTS

First Embodiment

FIG. 1A–FIG. 4 illustrate the polarization device in the first embodiment of the present invention and a projection type display apparatus employing this polarization device.

Figure 1A:
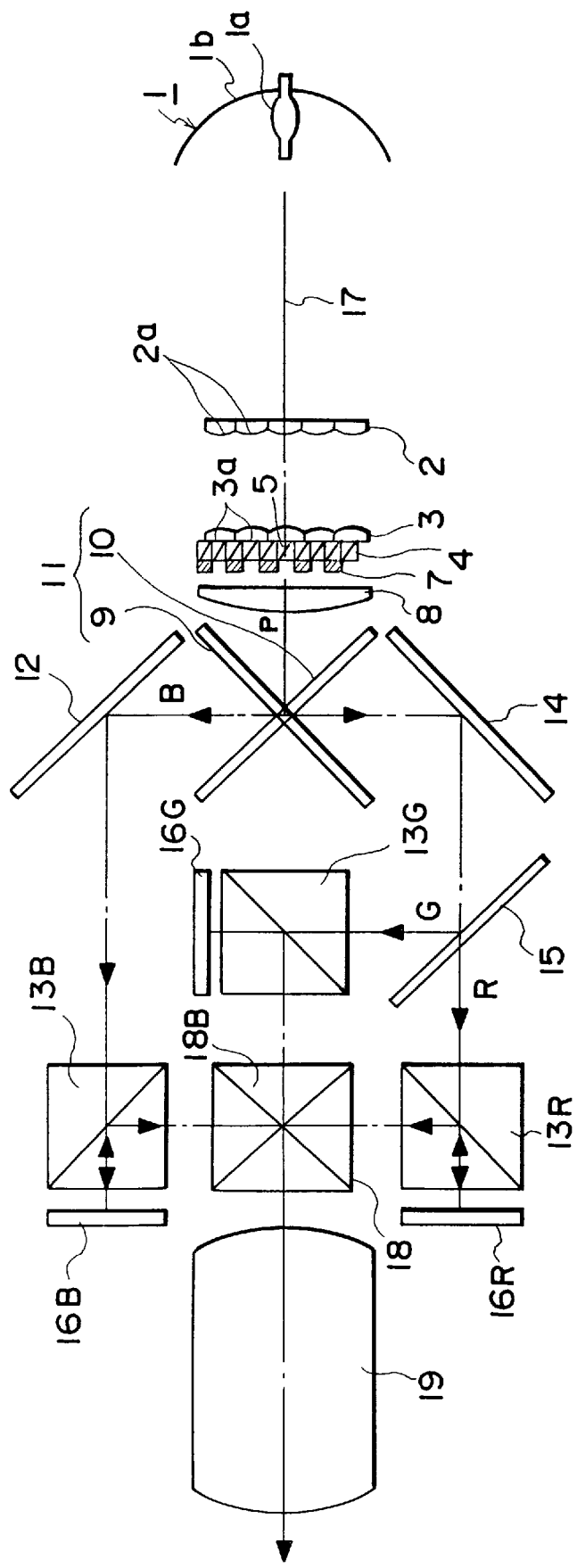
FIG. 1A is a configuration diagram illustrating the polarization device and the projection type display apparatus in a first embodiment.

As shown in FIG. 1A, a light source unit 1 comprises a lamp 1a a and a concave mirror 1b constituted of a parabolic mirror, and light from the light source unit 1 (hereinafter maybe called light source light) constituted of substantially parallel beams emitted from the light source unit 1 travels through an infrared absorbing filter and an ultraviolet absorbing filter (not shown) to enter a first lens plate 2 constituted of a planar configuration of lenses 2a where it is divided into beams defined by the apertures (or openings) formed by the individual lenses 2a of the first lens plate 2. These beams are then made to enter a second lens plate 3.

Figure 1B:
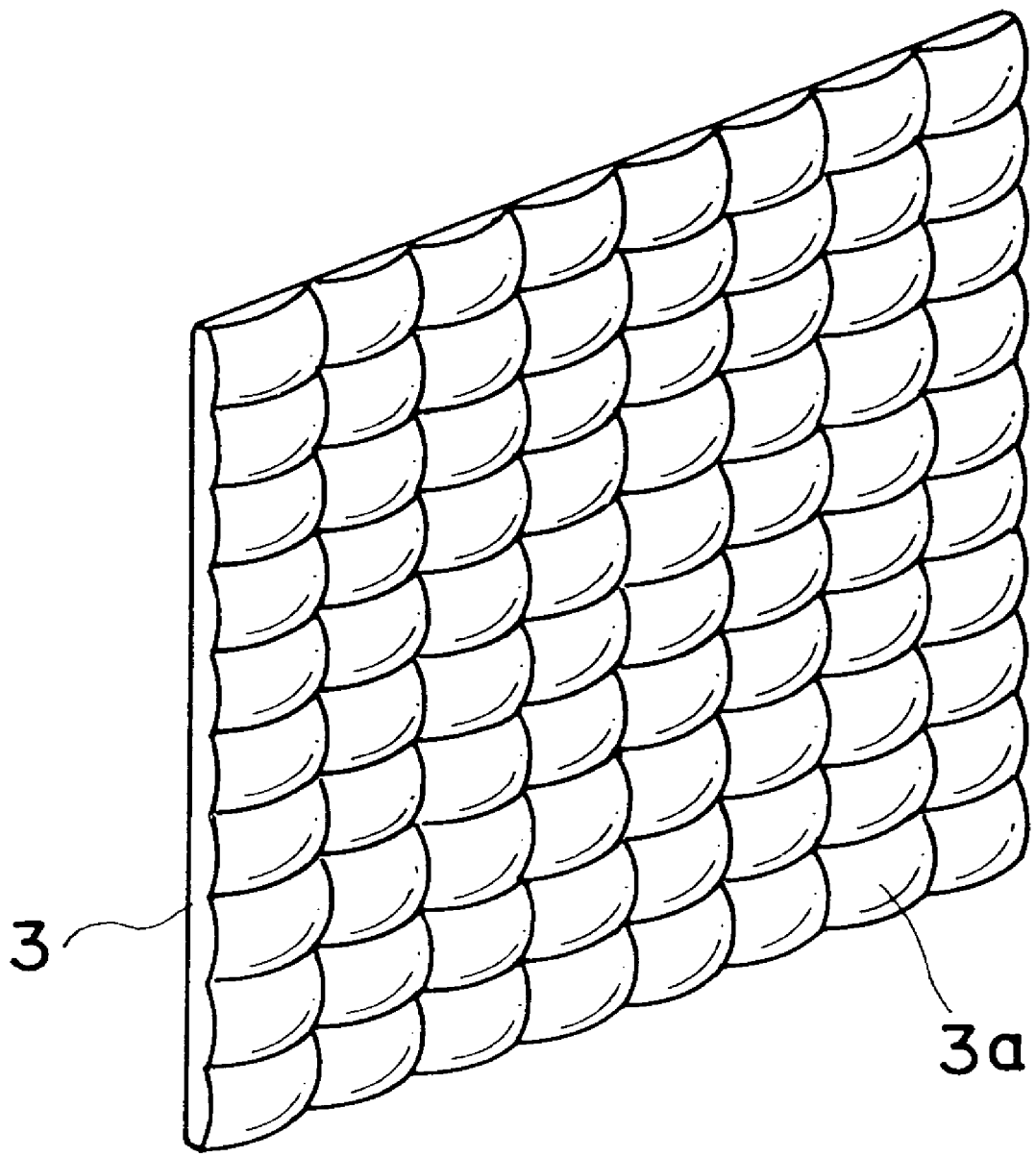
FIG. 1B is a perspective of the second lens plate 3, viewed from the side where the first lens plate 2 is present.

At the second lens plate 3, which is constituted by providing a plurality of lenses 3a in a planar configuration, the lenses 3a are positioned in correspondence to the individual lenses 2a of the first lens plate 2 at the focal point positions of the individual lenses 2a. FIG. 1B is a perspective of the second lens plate 3 viewed from the side on which the first lens plate 2 is provided. The first lens plate 2 has a similar perspective when viewed from the side where the second lens plate 3 is provided.

It is to be noted that while arrays of 8 across ×10 down of the lenses 2a and the lenses 3a are formed, as illustrated in FIG. 1B, only 5 each of the lenses are shown in the cross sectional configuration diagram in FIG. 1A in order to simplify the diagram.

The first lens plate 2 and the second lens plate 3 constitute a so-called fly-eye integrator.

The light source light that has traveled through a lens 2a of the first lens plate 2 then passes through the corresponding lens 3a of the second lens plate 3 and enters a PBS array 4 which is provided in close proximity to or bonded to the emission surface of the second lens plate 3.

Figure 4:
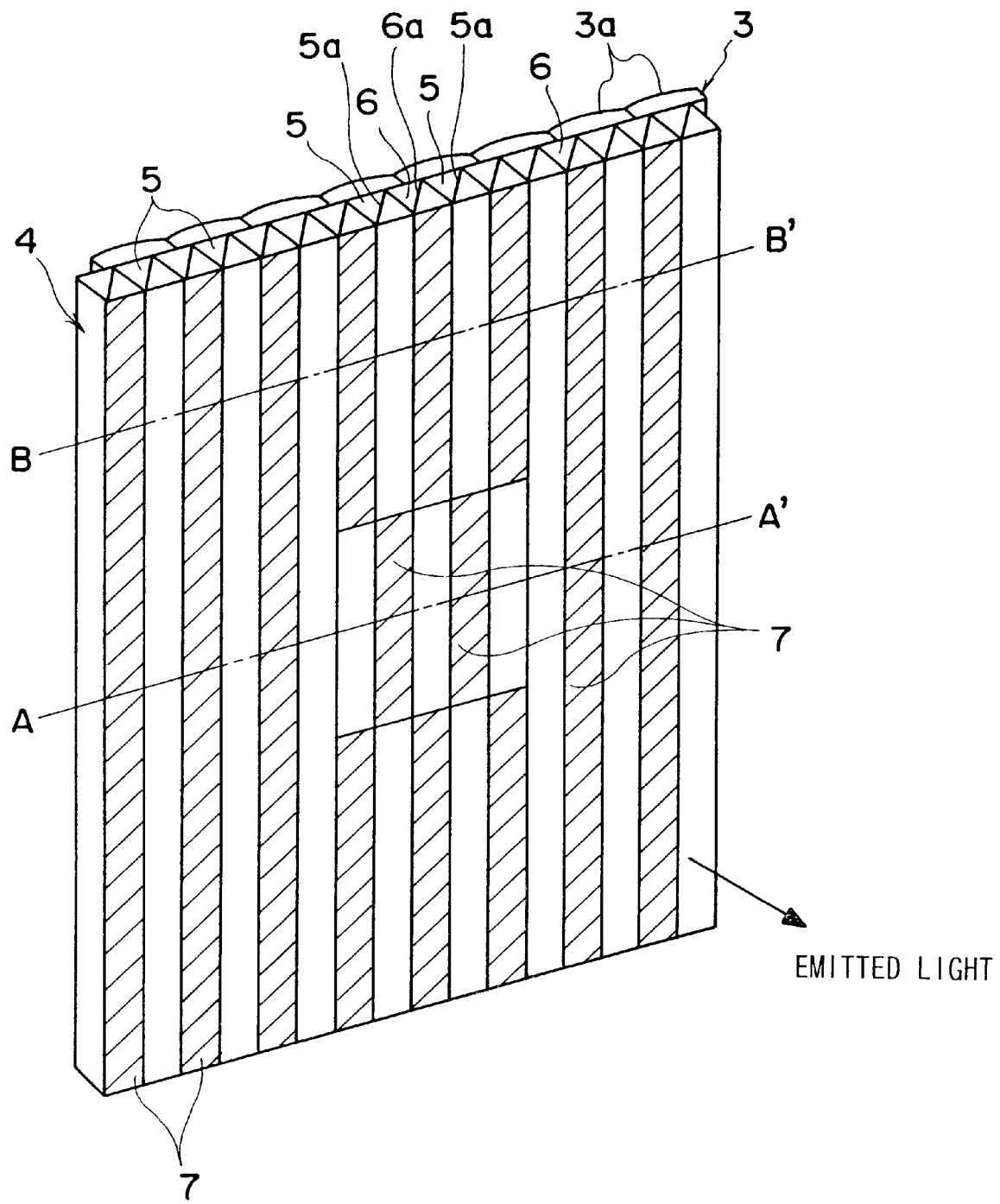
FIG. 4 is a configuration diagram of the polarization beam splitter array and the like employed in the polarization device in the first embodiment in perspective.

The PBS array 4 is constituted in the form of a plate, by continuously providing a plurality of PBS's 5 and 6, for a total of 16 PBS's in this embodiment, both formed in a square pillar shape having a square cross section, alternately to each other with their side surfaces bonded to each other (see FIG. 4). It is to be noted that for the purpose of simplification, FIG. 1A shows 10 PBS's since illustrating 16 PBS's 5 and 6 would become too complicated.

Of the PBS's 5 and 6, the PBS's 5 are positioned in correspondence to the centers of the individual lenses 3a of the second lens plate 3, and the PBS's 6 are positioned in correspondence to the boundaries between the individual lenses 3a.

In the PBS's 5 and 6, polarization splitter portions 5a and 6a (see FIG. 4) are provided on diagonal lines inclining at an angle of 45 degrees relative to the optical axis, and the individual polarization splitter portions 5a and 6a are all provided parallel to one another.

In addition, at specific positions of the emission surface of the PBS array 4, halfwave plates 7 are bonded. The halfwave plates 7 are constituted of a polymer film or a crystal plate, and fulfill a function of converting incident p-polarized light to s-polarized light or incident s-polarized light to p-polarized light by arranging an optical axis of the halfwave plate in 45 degrees relative to a vibrating direction of incident linearly polarized light. It is to be noted that the halfwave plates 7 may be constituted of liquid crystal instead.

The light that has entered a lens 3a of the second lens plate 3 as described above is emitted through the lens 3a to enter a PBS 5 constituting the PBS array 4 described above where it undergoes the process of polarization splitting in which it is split (or separated) into p-polarized light that passes through the polarization splitter portion 5a of the PBS 5 and s-polarized light that is reflected at the polarization splitter portion 5a of the PBS 5, is emitted through a side surface of the PBS 5 to enter an adjacent PBS 6 and is reflected by the polarization splitter portion 6a of the adjacent PBS 6.

At the emission surface of the adjacent PBS 6, where a halfwave plate 7 is provided, the s-polarized light that has entered the PBS 6 travels through the halfwave plate 7 where it is converted to p-polarized light and is then emitted.

Thus, all the light source light is emitted from the polarization device, which is a polarization optical system constituted of the light source unit 1, the first lens plate 2, the second lens plate 3, the PBS array 5 and the halfwave plates 7 explained above, as p-polarized light.

The p-polarized light thus emitted from the polarization device then travels through a condenser lens 8 to enter a cross dichroic mirror 11. The cross dichroic mirror 11 is provided in such a manner that a B light reflection dichroic mirror 10 and a G, R light reflection dichroic mirror 9 are positioned orthogonally to each other to form an incident angle of 45 degrees relative to the optical axis of the incoming light. At this cross dichroic mirror 11, the light undergoes color separation to be separated into B light and G, R mixed light having optical axes parallel to each other but traveling in opposite directions.

The B light achieved through the color separation is caused to change (or bend) its optical axis by 90 degrees by a bending mirror 12 and then it advances until it enters a B light polarization beam splitter 13B having a polarization splitter portion provided to allow the p-polarized B light to be transmitted through it.

The R, G mixed light is caused to change its optical axis by 90 degrees by a bending mirror 14 and advances until it enters a G light reflection dichroic mirror 15 provided to achieve an incident angle of 45 degrees relative to the optical axis of the incoming light on the optical axis where it undergoes color separation to be separated into G light that is reflected and advances after changing its optical axis by 90 degrees and R light which advances with no change of axis.

The G light and the R light achieved through the color separation are both p-polarized light, and they respectively enter a G light polarization beam splitter 13G and an R light polarization beam splitter 13R, each having a polarization splitter portion provided to allow the corresponding p-polarized light to be transmitted through it.

In other words, the dichroic mirrors 9 and 10 and the dichroic mirror 15 constitute a color separation optical system that separates the light into R, G and B light.

A B light light valve 16B, a G light light valve 16G and an R light light valve 16R are provided in the vicinity of the emission surfaces through which the individual different color light beams that have entered the corresponding polarization beam splitters 13B, 13G and 13R and have been transmitted through the polarization beam splitters 13B, 13G and 13R are emitted.

Each of the light valves 16R, 16G and 16B employed in this embodiment is an electric-writable reflection type liquid crystal light valve and has a function of reflecting and emitting modulated light (s-polarized light) by modulating incident polarized light (p-polarized light) only at positions selected by a corresponding color signal over a specific pixel area and reflecting and emitting the incident light unchanged, i.e., as p-polarized light at unselected positions.

The light beams that have been emitted from the light valves 16R, 16G and 16B for different color light beams respectively enter the polarization beam splitters 13B, 13G and 13R for different color light beams again, and at the polarization splitter portions of the polarization beam splitters 13B, 13G and 13R, only the modulated light (s-polarized light) is reflected to be detected (or analyzed) and then emitted, whereas unmodulated light (p-polarized light) advances unchanged to be ultimately discarded. The polarization beam splitters 13B, 13G and 13R constitute a detecting optical system that detects modulated light among light emitted from the light valves 16R, 16G and 16B for different color light beams. Then the detected different color light beams are made to enter, through different entry surfaces, a cross dichroic prism 18 constituting a composition optical system where color composition (or synthesis or combining) is implemented.

The cross dichroic prism 18 is a prism constituted by internally providing a B light reflection dichroic film 18B and an R light reflection dichroic film 18R orthogonally to each other, and the detected light beams that have entered the prism 18, i.e., the R light and the B light, are respectively reflected by the dichroic film 18R and the dichroic film 18B to change their optical axes by 90 degrees, and advance in the same direction to be emitted from the prism 18.

The detected G light, on the other hand, is transmitted and advances through the two dichroic films 18B and 18R unchanged, and with the G light advancing and being emitted with its optical axis extending in the same direction as that of the R light and the B light, color composition of the R, G and B light beams is achieved.

The composite light enters a projection lens 19 constituting a projection optical system and is projected as a full-color image on a screen (not shown).

This completes the explanation of the structure of the projection type display apparatus in the first embodiment.

Now, the polarization device in the first embodiment is explained in further detail in reference to FIGS. 2–4.

FIG. 4 is a perspective of the second lens plate 3, the PBS array 4 and the halfwave plates 7 in the polarization device in the first embodiment, viewed from the side where the emission surfaces of these members are present.

The lenses 3a of the second lens plate 3 are disposed in an 8 across ×10 down array, as described earlier, with the PBS array 4 constituted of a plurality of PBS's 5 and 6 bonded at the emission surface side of the lens plate 3 and the polarization splitter portions 5a and 6a of the PBS's 5 and 6 all provided parallel to one another.

The lateral width of the PBS's 5 and 6 is half the lateral width of the lenses 3a of the lens plate 3, with the PBS's 5 positioned to align with the approximate centers of the individual lenses 3a of the second lens plate 3 and the PBS's 6 positioned to align with the boundaries of the individual lenses 3a constituting the second lens plate 3.

In addition, the halfwave plates 7 (the shaded areas in FIG. 4) are bonded onto the emission surface side of the PBS array 4. And they are provided at the entire emission surfaces of the PBS's 6 except for in the central area of the PBS array 4. The PBS's 6 are arranged alternately at the boundaries between the individual lenses 3a.

Furthermore, in the central area of the PBS array 4, the halfwave plates 7 are provided at the emission surfaces of the PBS's 5 instead of at the emission surfaces of the PBS's 6. Consequently, in the central area of the PBS array 4 the halfwave plates 7 are provided at positions different from those at the peripheral area of the PBS array 4, excluding the central area.

It is to be noted that line A–A' in FIG. 4 indicates the position at which the PBS array 4 and the second lens plate 3 are cut along the thickness direction in the central area in the vertical direction and line B–B' indicates a position at which their upper portions are cut along the thickness direction.

FIG. 2 is a configuration diagram of the polarization device according to the present invention viewed from above showing the section cut along the above-mentioned line A–A', the condenser lens 8, the polarization beam splitter 13 and the light valve 16, superimposed with a diagram of light beams. FIG. 3 is a configuration diagram of the polarization device according to the present invention viewed from above showing the section cut along the above-mentioned line B–B', the condenser lens 8, the polarization beam splitter 13 and the light valve 16, superimposed with a diagram of light beams.

While, strictly speaking, FIGS. 2 and 3 should illustrate an R light, a G light and a B light, as in FIG. 1, the individual light valves 16B, 16G and 16R are presented as a single light valve 16 and the polarization beam splitters 13B, 13G and 13R for different color light beams are presented as a single polarization beam splitter 13 in FIGS. 2 and 3 by omitting the illustration of the color separation optical system since the lengths of the optical paths of the individual color light beams reaching the corresponding light valve 16B 16G and 16R are the same.

As shown in FIG. 2, the light source light, which is roughly parallel light emitted from the light source unit 1, enters the first lens plate 2 as explained earlier where it is divided into a plurality of beams at apertures formed by the lenses 2a (8 across ×10 down) constituting the lens plate 2, and the individual beams resulting from this division enter lenses 3a constituting the second lens plate 3 that correspond to the lenses 2a. Due to the characteristics of the light source unit 1, at the peripheral area of the second lens plate 3 excluding the central area, the light is converged at the center of the lenses 3a to constitute light spots that act as point light sources at the lenses 3a of the second lens plate 3, as shown at the outermost side in FIG. 2.

As illustrated in FIG. 2, the light emitted from the light spot of a lens 3a enters one of the PBS's 5 constituting the PBS array 4, where it undergoes the process of polarization splitting to be split into p-polarized light that is emitted from the PBS 5 and s-polarized light that is reflected by the polarization splitter portion 5a. The s-polarized light enters an adjacent PBS 6, is reflected by the polarization splitter portion 6a of the PBS 6 and is emitted to be converted to p-polarized light by the halfwave plate 7 provided at the emission surface. The p-polarized light emitted from the two PBS's 5 and 6 both travel through the condenser lens 8 and through the polarization beam splitter 13 to illuminate the entire light valve 16 with a high degree of efficiency. It is to be noted that, as explained earlier, the process implemented at the polarization splitter portion of the polarization beam splitter 13, which is provided by allowing incoming polarized light to be transmitted through it, is the same as that explained earlier.

However, as mentioned earlier, due to the influence of the light source lamp 1a and the like, in the central area of the second lens plate 3, a light spot is not formed at the center of a lens 3a, unlike in the peripheral area of the second lens plate 3, and instead, the light spot is widened and spreads out. This embodiment is particularly effective in case that the light spot is widened with the intensity higher in the peripheral area of the widened light spot rather than at the center of the lens 3a.

In this embodiment, as illustrated in FIG. 4, in the area corresponding to the 2×2 lenses 3a in the central area in the 8 across ×10 down array of the lenses 3a of the second lens plate 3, the arrangement of the halfwave plates 7 is reversed from that at the peripheral area of the second lens plate 3. In other words, at the central area of the second lens plate 3, the halfwave plates 7 are provided at the emission surfaces of the PBS's 5 instead of at the emission surfaces of the PBS's 6.

The light emitted from a light spot which is formed at the circumferential edge of a lens 3a of the second lens plate 3 adjacent to the optical axis 17 in FIG. 2 enters a PBS 6. Then, p-polarized light that has been transmitted through the polarization splitter portion 6a of the PBS 6 is emitted unchanged as p-polarized light, since no halfwave plate 7 is provided at the emission surface of the PBS 6. In addition, s-polarized light that has been reflected by the polarization splitter portion 6a enters an adjacent PBS 5 where it is reflected by its polarization splitter portion 5a, and with a halfwave plate 7 provided at the emission surface of the PBS 5, it is converted to p-polarized light and is emitted.

The p-polarized light thus emitted from the polarization device is illuminated on the light valve 16 by the condenser lens 8.

Thus, while most of the light would enter the polarization beam splitter 13 as s-polarized light to be discarded in the prior art as explained earlier, light entering the circumferential edge of the lens 3a can be employed as illuminating light for the light valve 16 in the embodiment.

Now, FIG. 3 is a configuration diagram superimposed with a diagram of light beams in a cross section along line B–B' in FIG. 4, showing the peripheral area of the second lens plate 3 excluding the central area.

At the peripheral area, which is not greatly affected by the lamp 1a and the like of the light source unit 1, the light source light that has entered a lens 2a of the first lens plate 2 is converged at the corresponding lens 3a of the second lens plate 3 to form a light spot at approximately the center of the lens 3a.

In FIG. 3, a diagram of light beams with respect to the lenses 3a at the two sides of the peripheral area of the second lens plate 3 and the lens 3a in the central area in the widthwise direction (not the central area of the second lens plate 3) is presented, as in FIG. 2. It is to be noted that, as illustrated in FIG. 4, the halfwave plates 7 are not provided at the emission surfaces of the PBS's 5 provided at positions where the incoming light entering the individual lenses 3a of the second lens plate 3 is allowed to be transmitted unchanged but at the emission surfaces of the PBS's 6 adjacent to them, in the peripheral area.

Thus, beams from the light source that have entered a lenses 2a at the sides (the upper side or the lower side in FIG. 3) of the first lens plate 2 are converged at the corresponding lenses 3a of the second lens plate 3 to form light spots at the lenses 3a. The light emitted from these light spots enters the PBS's 5 of the PBS array 4 provided at the emission surface of the lenses 3a, and undergoes polarization splitting through the PBS's 5 to be split into p-polarized light to be transmitted and emitted from the PBS's 5 and s-polarized light to be reflected by the polarization splitter portions 5a. The s-polarized light then enters adjacent PBS's 6 where it is reflected by the polarization splitter portion 6a and emitted, where it is converted to p-polarized light at the halfwave plates 7 provided at the emission surface of the PBS's 6, to be emitted.

In addition, the light source light entering a lens 2a at the center of the peripheral area of the first lens plate 2 in the widthwise direction forms a light spot at approximately the center of the corresponding lens 3a of the second lens plate 3 as is the case on the two sides of the first lens plate 2, and consequently, it enters the PBS5 of the PBS array 4 formed at the rear of the lens 3a where it is split into p-polarized light to be transmitted through the PBS 5 and s-polarized light which is to be reflected to enter an adjacent PBS 6. Then, the s-polarized light is converted to p-polarized light at the halfwave plate 7 provided at the emission surface of the PBS 6 and is emitted.

The p-polarized light emitted from the polarization device in this manner is caused to travel through the polarization beam splitter 13 by the condenser lens 8 in a similar manner to illuminate the light valve 16.

As has been explained, in the first embodiment, considering a case of the distribution of the quantity of light being higher at the circumferential edge of a lens 3a of the second lens plate 3 than in the central area (near the optical axis 17) of the second lens plate 3, the halfwave plates 7 provided at the emission surfaces of the PBS's 5 and 6 constituting the PBS array 4 provided at the rear, has an arrangement at the peripheral area which reverses an arrangement in the central area in the second lens plate 3. Thus, while characteristics whereby polarized light different from that at the peripheral area is emitted in the central area manifest in the method in the prior art, polarized light which is the same as that at the peripheral area can be emitted in the central area according to the present invention to achieve high intensity illumination of the light valve 16. As a result, a great advantage is achieved in that a projected image with a high degree of intensity can be obtained.

It is to be noted that, while the first lens plate 2 and the second lens plate 3 employed in the first embodiment respectively have lenses 2a and 3a in an array of 8 across ×10 down, and the position of the central areas where the arrangement of the halfwave plates 7 is reversed in phase corresponds to the central 2×2 lenses among the 8 across ×10 down lenses 2a or 3a, the present invention is not restricted to this structure. Namely, while the position of the central area remains the same, i.e., having the optical axis 17 at its center, the size of this area, which will correspond to such factors as the size of the lamp, is not restricted to the size in this embodiment. In addition, while the shape of the central area where the halfwave plates 7 are arranged in reverse order from that assumed at the peripheral area is quadrangular in this embodiment, it goes without saying that the shape is not limited to this and that it may be formed in a circular shape, an oval shape or the like. Furthermore, the numbers of the lenses 2a and 3a constituting the first lens plate 2 and the second lens plate 3 and their arrangement are not restricted to those adopted in the embodiment, either.

Moreover, while the projection type display apparatus in the embodiment has a structure in which p-polarized light transmitted through the polarization beam splitters 13R, 13G and 13B for light of different color enters the light valves 16R, 16G and 16B, an alternative structure in which light valves for different color 16R, 16G and 16B are provided near the emission surfaces of the polarization beam splitters 13R, 13G and 13B so that s-polarized light reflected via the polarization splitter portions of the individual polarization beam splitters 13R, 13G and 13B enters them, may be adopted. In that case, it is necessary to constitute the polarization illumination system in the embodiment by ensuring that the polarized light it emits is s-polarized light. This may be achieved by reversing the portions where the halfwave plates 7 are formed and the portions where they are not formed in the PBS array 4 in FIG. 4. In other words, the shaded areas in FIG. 4 would represent portions where the halfwave plates 7 are not formed and the blank areas would represent portions where the halfwave plates 7 are formed.

Second Embodiment

Next, the second embodiment is explained. The second embodiment differs from the first embodiment only in the arrangement of its halfwave plates 7, and is otherwise identical to the first embodiment. Thus, an explanation will be given here focusing on the details related to the halfwave plates 7, and explanation is otherwise omitted.

Figure 5:
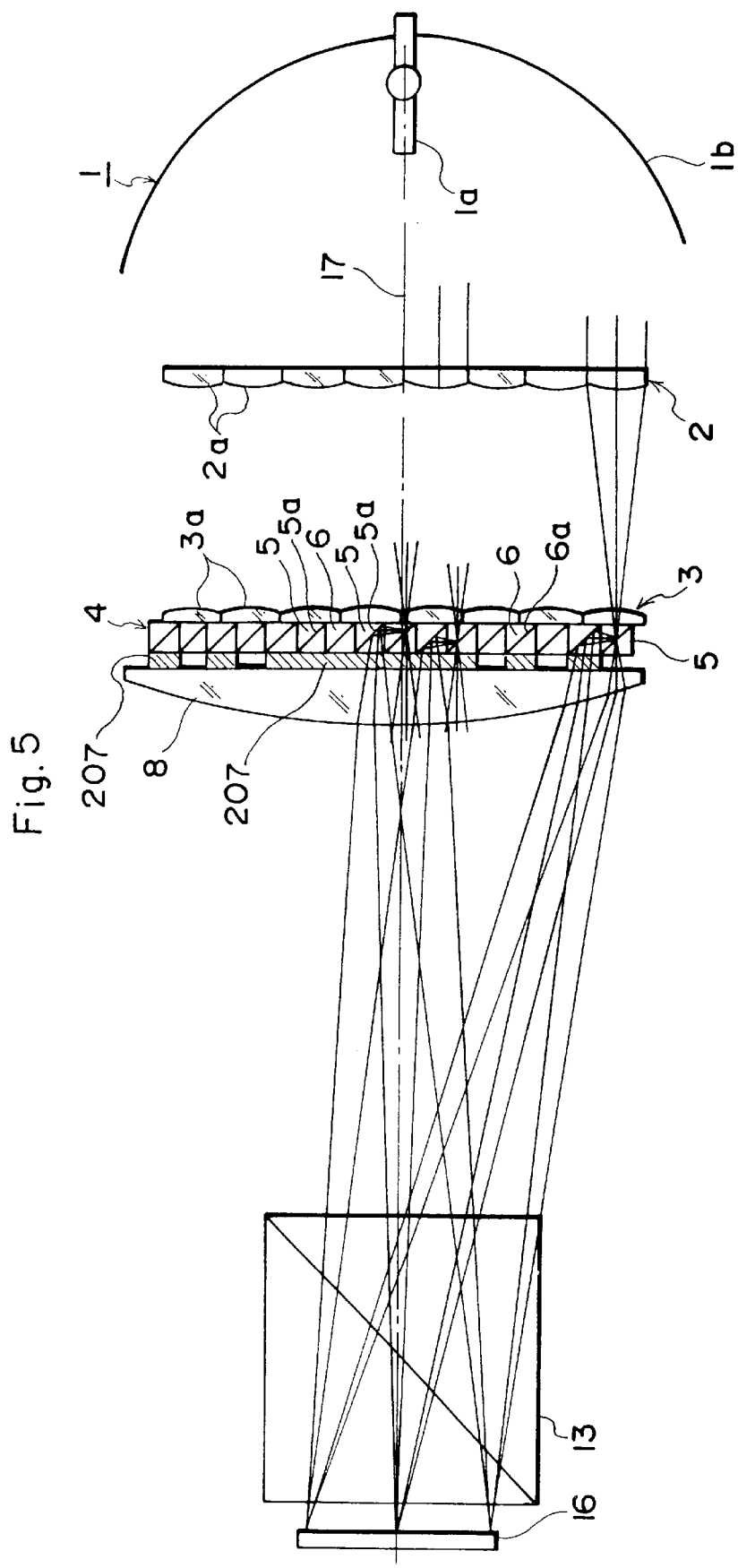
FIG. 5 is a configuration diagram superimposed with a diagram of light beams, illustrating the polarization device in a second embodiment in a cross section through approximately the center.
Figure 6:
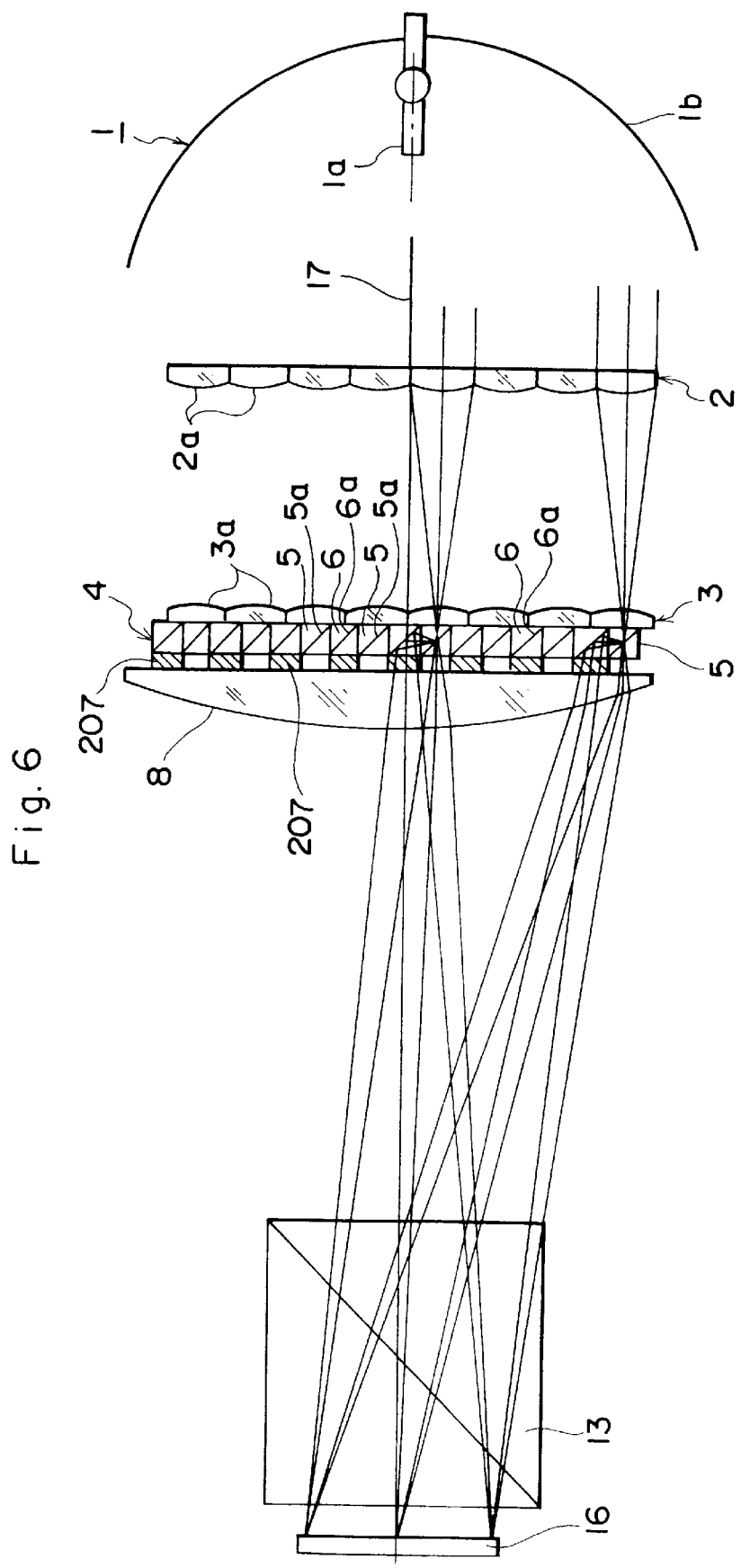
FIG. 6 is a configuration diagram superimposed with a diagram of light beams, illustrating the polarization device in the second embodiment in a cross section through a peripheral area.
Figure 7:
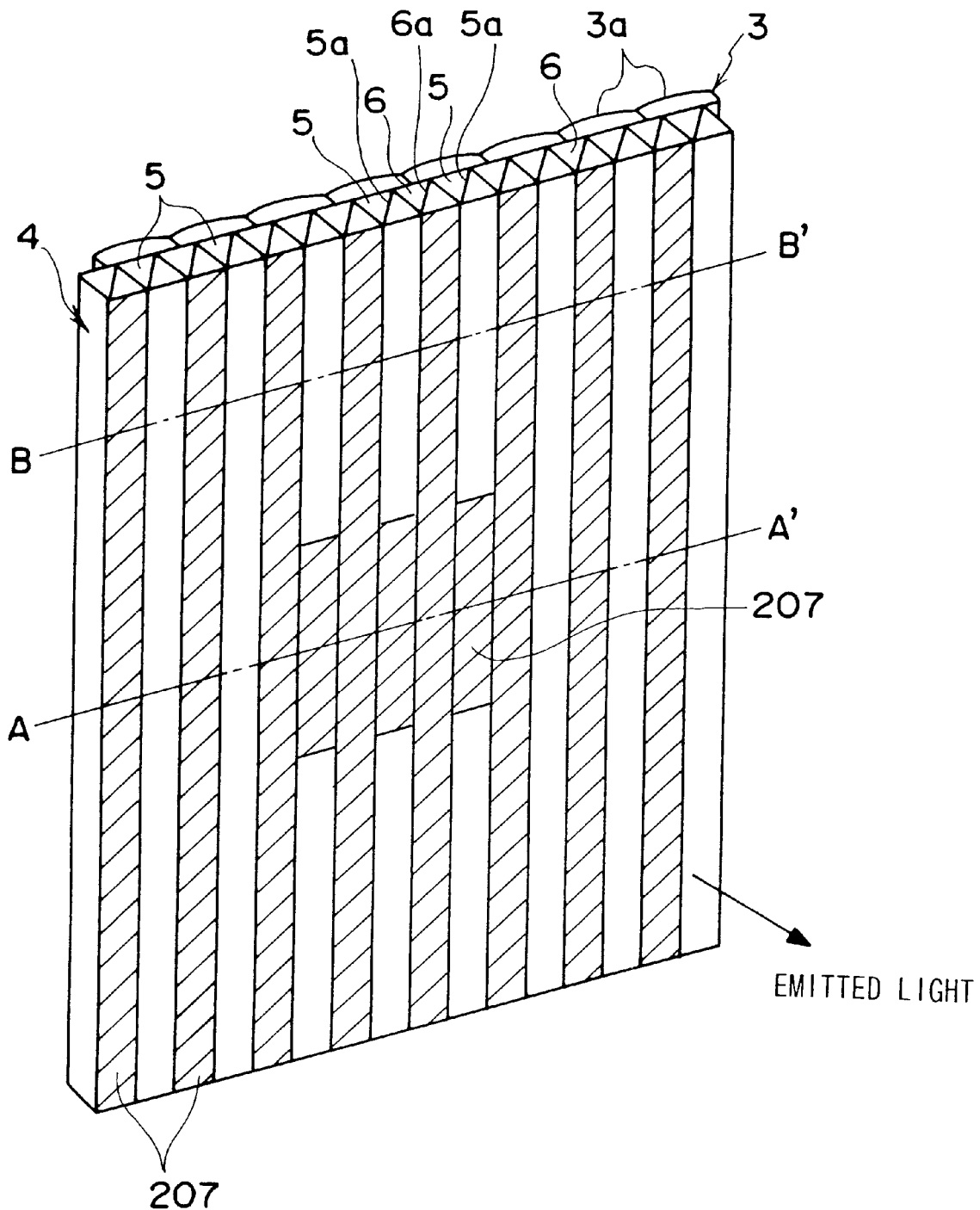
FIG. 7 is a configuration diagram of the polarization beam splitter array and the like employed in the polarization device in the second embodiment in perspective.

Now, the explanation is given in reference to FIGS. 5–7. The same reference numbers are assigned to components identical to those in the first embodiment. FIG. 7 is a perspective of the second lens plate 3, the PBS array 4 and halfwave plates 207 in the polarization device in the second embodiment, viewed from the side where the emission surfaces of those members are present.

While the halfwave plates 7 are provided at the emission surfaces of the PBS's 5 and not at the emission surfaces of the PBS 6 in the central area of the PBS array 4 in the first embodiment (see FIG. 4), the halfwave plates 207 are provided over the entire surface of the second lens plate 3 in the area corresponding to (2×2=4) lenses 3a over a plurality of PBS's 5 and 6 in the second embodiment.

It is to be noted that as in the case of the first embodiment, the line A–A' in FIG. 7 indicates the position at which the PBS array 4 and the second lens plate 3 are cut along the thickness direction through the central area in the vertical direction and line B–B' indicates the position at which their upper portions are cut along the thickness direction.

FIG. 5 is a configuration diagram superimposed with a diagram of light beams illustrating the polarization device according to the present invention viewed from above showing the section cut along line A–A', the condenser lens 8, the polarization beam splitter 13 and the light valve 16, and FIG. 6 is a configuration diagram superimposed with a diagram of light beams illustrating the polarization device according to the present invention viewed from above showing the section cut along line B–B', the condenser lens 8, the polarization beam splitter 13 and the light valve 16.

As already explained in reference to the first embodiment, at the lens 3a in the central area of the second lens plate 3, which is subject to the influence of the light source lamp 1a and the like, a light spot is not formed at the center of the lens 3a, unlike at the peripheral area of the second lens plate 3, but instead, its light spot has spread out. And there is a case that the light spot spreads out with an area of high intensity formed at the periphery of the widened light spot rather than at the center of the lens 3a.

As illustrated in FIG. 7, the second embodiment has a structure in which the halfwave plates 207 are provided over the entire central area corresponding to the 2×2 lenses 3a in the 8 across ×10 down arrangement of the lenses 3a in the second lens plate 3.

Since a light spot is formed at the peripheral area of the lens 3a of the second lens plate 3 adjacent to the optical axis 17 in FIG. 5, as explained earlier, the light emitted from this light spot enters a PBS 6. Then, p-polarized light that has been transmitted through the polarization splitter portion 6a of the PBS 6 is transmitted through the halfwave plate 207 provided at the emission portion of the PBS 6 where it is converted to s-polarized light and emitted. In addition, the s-polarized light that is reflected at the polarization splitter portion 6a then enters an adjacent PBS 5 where it is reflected by the polarization splitter portion 5a, and since a halfwave plate 207 is provided at the emission surface of this PBS 5, it is converted to p-polarized light and emitted.

The p-polarized light and the s-polarized light emitted from the polarization device are caused to enter the polarization beam splitter 13 by the condenser lens 8, and the p-polarized light is illuminated onto the light valve 16.

Thus, while most of the light enters the polarization beam splitter 13 as s-polarized light in the prior art to be discarded, half of the light can be employed as illumination light for the light valve 16 in the second embodiment.

It is to be noted that the operation at the peripheral area other than in the central area in FIG. 5, i.e., the operation performed at the upper side and the lower side of the second lens plate 3 in FIG. 5, is identical to that in the first embodiment.

In addition, FIG. 6 is a configuration diagram superimposed with a diagram of light beams in a cross section along line B–B' in FIG. 7, i.e., at the peripheral area of the second lens plate 3 excluding the central area. Since the operation illustrated in FIG. 6, too, is identical to that in the first embodiment, its explanation is omitted. As has been explained, in consideration of a case in which the distribution of the quantity of light is higher in the peripheral area than at the approximate center of the lens 3a of the second lens plate 3 in the central area of the second lens plate 3, the halfwave plates 207 are provided at the PBS array 4 which is located at the rear of the central area. Thus, while no light emitted from the central area of the second lens plate 3 can be employed to illuminate the light valve 16 in the method in the prior art, at least approximately half of the light emitted from this area can be utilized as an illuminating light for the light valve 16. As a result, illumination with a high degree of intensity can be achieved for the light valve 16 and a great advantage is achieved in that projected images with high intensity can be obtained.

Each of the first lens plate 2 and the second lens plate 3 employed in the second embodiment respectively have an 8 across ×10 down arrangement of the lenses 2a and 3a. And their central areas where the halfwave plates 207 are provided continuously over a plurality of PBS's 5 and 6 are respectively set at the position corresponding to the central 2×2 lenses among the 8 across ×10 down lenses 2a or 3a. However, the present invention is not restricted to this structure. Namely, while the position of the central area remains the same, i.e., having the optical axis 17 at its center, the size of this area, which will correspond to such factors as the size of the lamp, is not restricted to the size in this embodiment. In addition, while the shape of the central area where the halfwave plates 207 are provided over the entire surface ranging over a plurality of PBS's 5 and 6 is quadrangular in this embodiment, it goes without saying that the shape is not limited to this and that it may be formed in a circular shape, an oval shape or the like. Furthermore, the numbers of the lenses 2a and 3a constituting the first lens plate 2 and the second lens plate 3 and their arrangement is not restricted to those adopted in the embodiment either.

Moreover, while the projection type display apparatus in the embodiment has a structure in which p-polarized light transmitted through the polarization beam splitters 13R, 13G and 13B for light of different color enters the light valves 16R,16G and 16B, an alternative structure in which light valves for different color 16R,16G and 16B are provided near the emission surfaces of the polarization beam splitters 13R, 13G and 13B so that s-polarized light reflected via the polarization splitter portions of the individual polarization beam splitters 13R,13G and 13B enters them, may be adopted. In that case, it is necessary to constitute the polarization illumination system in the embodiment by ensuring that the polarized light it emits is s-polarized light. This may be achieved by leaving the halfwave plates 207 intact over the entire area corresponding to the 2 across ×2 down lenses 3a of the second lens plate 3 in the central area in FIG. 7 and by reversing the portions where the halfwave plates 207 are formed and the portions where no halfwave plates 207 are formed that are provided alternately at the peripheral area excluding in the central area, at the rear of the PBS array 4. In other words, the portions where the halfwave plates 207 are formed (shaded portions) should be changed to non-formation portions (blank portions) and the non-formation portions (blank portions) should be changed to portions where the halfwave plates 207 are formed at the peripheral area while leaving the halfwave plates 7 intact in the shaded portions in the central area in FIG. 7.

Third Embodiment

Next, the third embodiment is explained. As in the case of the second embodiment, the third embodiment differs from the first embodiment only in the configuration of its halfwave plates, and the other details are identical to those of the first embodiment. Thus, the explanation will be given here focusing on the details of the halfwave plates, and explanation is otherwise omitted.

Figure 10:
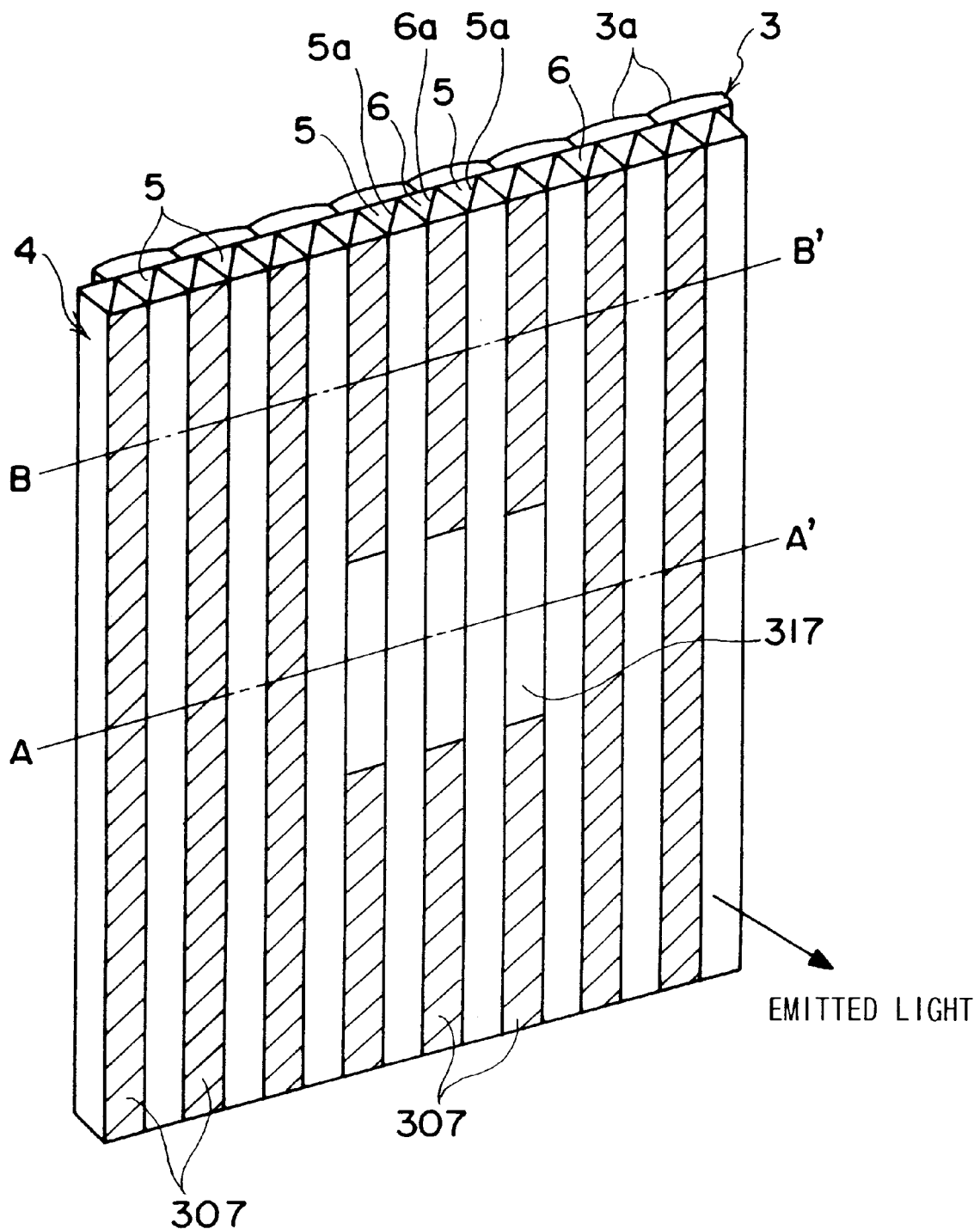
FIG. 10 is a configuration diagram of the polarization beam splitter array and the like employed in the polarization device in the third embodiment in perspective.

FIG. 10 is a perspective of the second lens plate 3, the PBS array 4 and halfwave plates 307 in the polarization device in the third embodiment, viewed from the side where the emission surfaces of those members are present.

While the halfwave plates 7 are provided at the emission surfaces of the PBS's 5 and not at the emission surfaces of the PBS's 6 in the central area of the emission surface of the PBS array 4 in the first embodiment (see FIG. 4), a quadrangular non-formation area 317 over which no halfwave plates 307 are provided over the entire surface ranging over a plurality of emission surfaces of the PBS's 5 and 6 constituting the PBS array 4 is formed in the third embodiment, as illustrated in FIG. 10. This non-formation area 317 corresponds to four (2×2) lenses 3a of the second lens plate 3.

It is to be noted that as in the case of the first embodiment, line A–A' in FIG. 10 indicates the position at which the PBS array 4 and the second lens plate 3 are cut along the thickness direction in the central area in the vertical direction and line B–B' indicates the position at which their upper portions are cut along the thickness direction.

Figure 8:
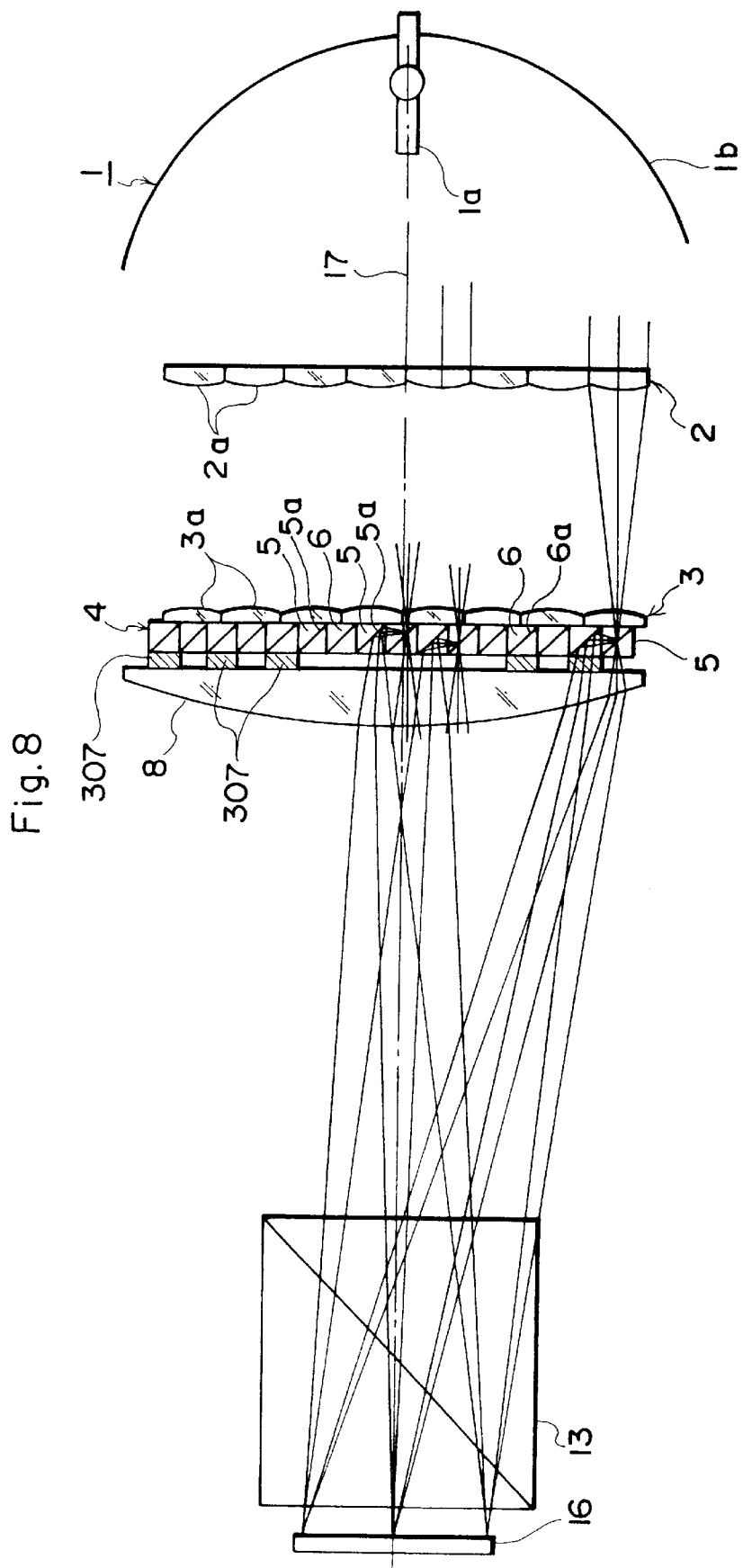
FIG. 8 is a configuration diagram superimposed with a diagram of light beams, illustrating the polarization device in a third embodiment in a cross section through approximately the center.
Figure 9:
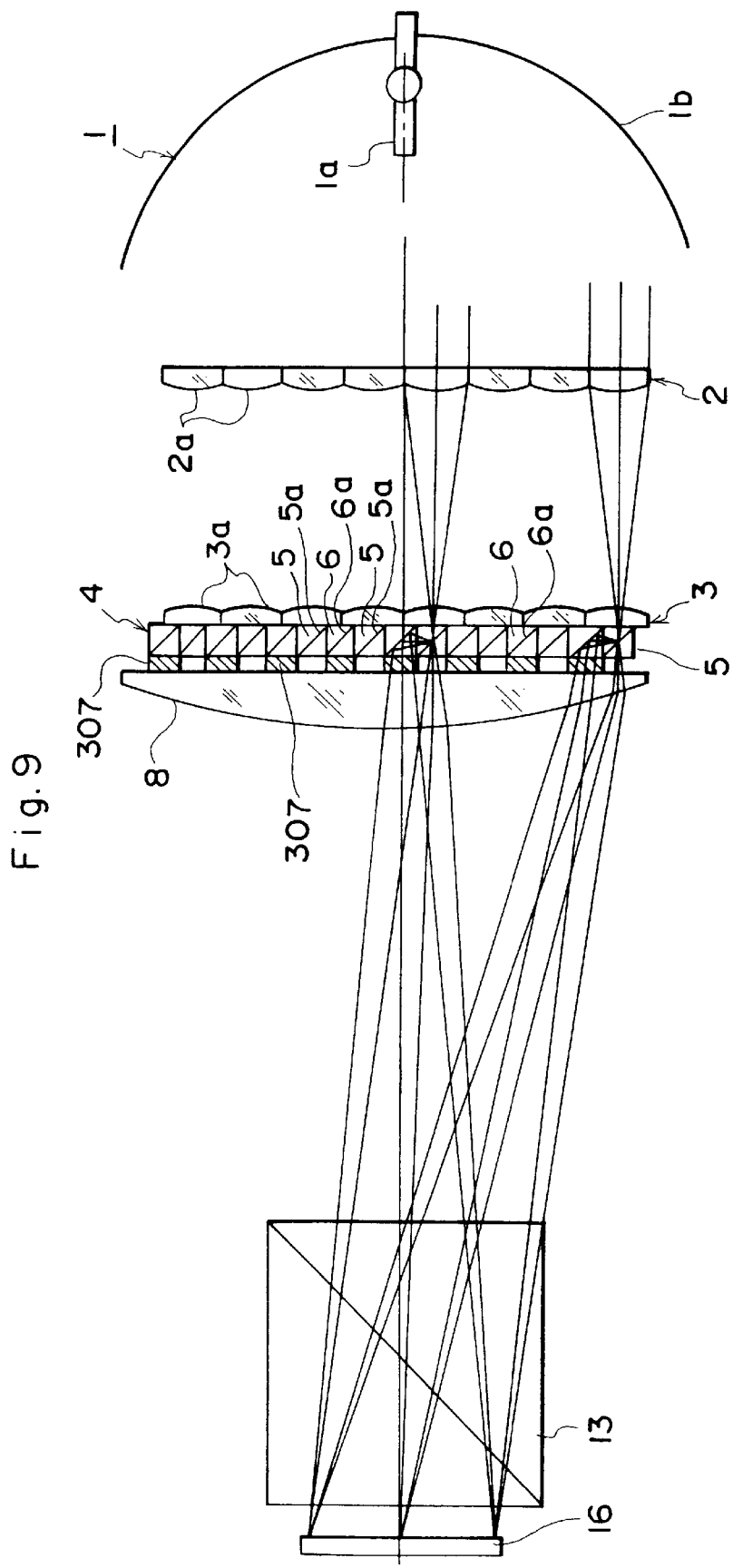
FIG. 9 is a configuration diagram superimposed with a diagram of light beams, illustrating the polarization device in the third embodiment in a cross section through a peripheral area.

FIG. 8 is a configuration diagram superimposed with a diagram of light beams illustrating the polarization device according to the present invention viewed from above showing its portion cut along line A–A', the condenser lens 8, the polarization beam splitter 13 and the light valve, and FIG. 9 is a configuration diagram superimposed with a diagram of light beams illustrating the polarization device according to the present invention viewed from above showing its portion cut along line B–B', the condenser lens 8, the polarization beam splitter 13 and the light valve 16.

As has already been explained in reference to the first and the second embodiments, this embodiment is also particularly effective in case that at the lenses 3a in the central area of the second lens plate 3, which are subject to the influence of the light source lamp 1a and the like, a light spot is not formed at the center of the lens 3a, unlike at the peripheral area of second lens plate 3, but instead, its light spot has spread with an area with high intensity formed in the periphery of the spread light spot rather than at the center of the lens 3a.

As illustrated in FIG. 10, the non-formation area 317 where no halfwave plates 307 are provided over the entire area is formed over the central 2×2 lenses 3a in the 8 across ×10 down arrangement of the lenses 3a of the second lens plate 3 in the third embodiment.

Since a light spot is formed at the circumferential edge of a lens 3a of the second lens plate 3 adjacent to the optical axis 17 in FIG. 8, the light emitted from the light spot enters a PBS 6. The p-polarized light that has been transmitted through the polarization splitter portion 6a of the PBS 6 is emitted unchanged as p-polarized light since no halfwave plate 307 is provided at the emission surface of the PBS 6. In addition, s-polarized light reflected at the polarization splitter portion 6a enters an adjacent PBS 5 where it is reflected by its polarization splitter portion 5a, and is emitted unchanged as s-polarized light due to the absence of a halfwave plate 307 at the emission surface of the PBS 5.

The p-polarized light and the s-polarized light emitted from the polarization device are caused to enter the polarization beam splitter 13 by the condenser lens 8, and the p-polarized light is illuminated onto the light valve 16.

Thus, while most of the light enters the polarization beam splitter 13 as s-polarized light in the prior art to be discarded, half of the light can be employed as illumination light for the light valve 16 in the third embodiment.

It is to be noted that the operation in areas other than in the central area, i.e., at the peripheral area in FIG. 8, in other words, the operation performed at the upper side and the lower side of the second lens plate 3 in FIG. 8, is identical to that in the first embodiment.

In addition, FIG. 9 is a configuration diagram superimposed with a diagram of light beams in a cross section along line B–B' in FIG. 10, i.e., at the peripheral area of the second lens plate 3 excluding the central area. Since the operation illustrated in FIG. 9, too, is identical to that in the first embodiment, its explanation is omitted.

As has been explained, in the third embodiment, in consideration of a case in which the distribution of the quantity of light is higher at the circumferential edge than at the center of the lens 3a of the second lens plate 3 in the central area of the second lens plate 3, the non-formation area 317 is set in the central area of the second lens plate 3 where halfwave plates 307, which are provided at the emission surfaces of the PBS's 5 and 6 constituting the PBS array 4 provided at the rear of the second lens plate 3, are not formed. Thus, while in the method in the prior art in which the characteristics manifest whereby polarized light different from that at the peripheral area is emitted in the central area, this emitted light cannot be utilized to illuminate the light valve 16, at least approximately half of the light emitted from this area can be employed as an illuminating light for the light valve 16 in the third embodiment, and as a result, illumination with a high degree of intensity can be achieved for the light valve 16 to obtain projected images with high intensity.

While the first lens plate 2 and the second lens plate 3 employed in the third embodiment each have 8 across ×10 down lenses 2a or 3a, the central area where the non-formation area 317 without any halfwave plates 307 is formed is set at the position corresponding to the central 2×2 lenses among the 8 across ×10 down lenses 2a or 3a. However, the present invention is not restricted to this structure. Namely, while the position in the central area remains the same, having the optical axis 17 at its center, the size of this area, which will correspond to such factors as the size of the lamp, is not restricted to the size in the third embodiment. In addition, while the shape of the central area where the non-formation area 317 is provided is quadrangular in this embodiment, it goes without saying that the shape is not limited to this and that it may be formed in a circular shape, an oval shape or the like. Furthermore, the numbers of the lenses 2a and 3a constituting the first lens plate 2 and the second lens plate 3 and their arrangement is not restricted to those adopted in the embodiment either.

Moreover, while the projection type display apparatus in the third embodiment has a structure in which p-polarized light transmitted through the polarization beam splitters 13R, 13G and 13B for different color light beams enters the light valve 16R, 16G and 16B, an alternative structure in which light valves 16R, 16G and 16B for different color light beams are provided near the emission surfaces of the polarization beam splitters 13R, 13G and 13B so that s-polarized light beams reflected via the polarization splitter portions of the individual polarization beam splitters 13R, 13G and 13B enters them may be adopted. In that case, it is necessary to constitute the polarization illumination system in the embodiment by ensuring that the polarized light it emits is s-polarized light. This may be achieved by leaving the non-formation area 317 at the center intact and by reversing the positions of the halfwave plates 307 provided in alternate rows at the peripheral area around the non-formation area 317 in FIG. 10. In other words, no halfwave plates 307 should be provided at the shaded portions and halfwave plates 307 should be provided at the blank portions at the outer peripheral area in FIG. 10.

Fourth Embodiment

FIGS. 11–14 illustrate the polarization device in the fourth embodiment and a projection type display apparatus employing this polarization device.

Figure 11:
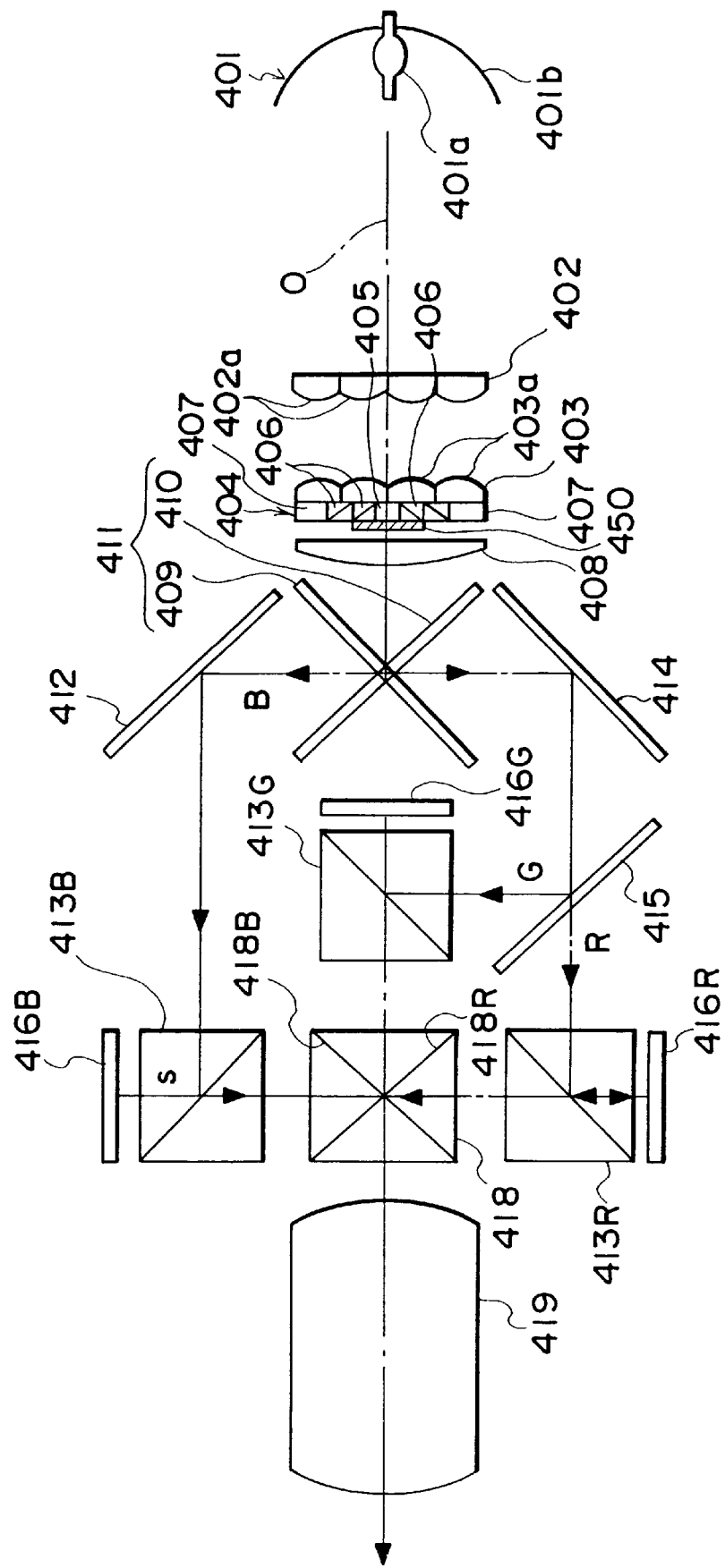
FIG. 11 is a configuration diagram illustrating the polarization device and the projection type display apparatus in a fourth embodiment.

In FIG. 11, a light source unit 401 comprises a lamp 401a and a concave mirror 401b constituted of a parabolic mirror, and the light source light constituted of roughly parallel beams emitted from the light source unit 401 enters a first lens plate 402 constituted by providing lenses 402a in a planar configuration via an infrared absorbing filter and an ultraviolet absorbing filter (not shown), where it is divided into beams defined by apertures formed by the individual lenses 402a of the first lens plate 402. Then, these beams enter a second lens plate 403.

In the second lens plate 403, which is achieved by providing a plurality of lenses 403a in a planar configuration, the lenses 403a are positioned in correspondence to the individual lenses 402a of the first lens plate 402 at the focal points of the individual lenses 402a.

The lenses 402a and 403a are formed in an arrangement of 4 across ×5 down, and the first lens plate 402 and the second lens plate 403 formed in this manner constitute a so-called fly-eye integrator. The shapes of the individual lenses 402a and 403a are identical to those illustrated in FIG. 1B.

The light source light that has traveled through a lens 402a of the first lens plate 402 passes through the corresponding lens 403a of the second lens plate 403 as described above and enters a prism array 404 provided in close proximity to or bonded to the emission surface of the second lens plate 403.

This prism array 404 is constituted of a first glass rod 405 provided at the boundary of the lenses 403a along the vertical direction on an optical axis O (at the center in the widthwise direction), PBS's 406 two each of which are provided on either side of the glass rod 405 and second glass rods 407 each provided at either side of the PBS's 406.

A halfwave plate 450 is pasted onto the emission surface of the first glass rod 405 and the emission surfaces of two PBS's 406 on the two sides of the first glass rod 405.

Thus, a mixed light constituted of random polarization light that has been transmitted through the first glass rod 405 and s-polarized light that has traveled through a PBS's 406 and the halfwave plate 450 is emitted.

This mixed light travels through a condenser lens 408 and enters a cross dichroic mirror 411. The cross dichroic mirror 411 is provided in such a manner that a B light reflection dichroic mirror 410 and a G, R light reflection dichroic mirror 409 are positioned orthogonally to each other to form an incident angle of 45 degrees relative to the optical axis of an incoming light. At this cross dichroic mirror 411, the light undergoes color separation to be separated into B light and G, R mixed light having optical axes parallel to each other traveling in opposite directions from each other.

The B light achieved through the color separation is caused to change (or bend) its optical axis by 90 degrees at a bending mirror 412 and advances until it enters a B light polarization beam splitter 413B having a polarization splitter portion provided to allow s-polarized light in the B light to be reflected and p-polarized light in the B light to be transmitted through it.

The R, G mixed light is caused to change its optical axis by 90 degrees at a bending mirror 414 and advances until it enters a G light reflection dichroic mirror 415 provided to achieve an incident angle of 45 degrees relative to the optical axis of the incoming light on the optical axis where it undergoes color separation to be separated into G light that is reflected and advances after changing its optical axis by 90 degrees and R light which advances with no change.

In other words, the dichroic mirrors 409 and 410 and the dichroic mirror 415 constitute a color separation optical system that separates light into R, G and B light beams.

The G light and the R light achieved through the color separation can enter a polarization beam splitter 413G for the G light and a polarization beam splitter 413R for the R light each having a polarization splitter portion provided to allow s-polarized light to be reflected and the p-polarized light to be transmitted.

In the vicinity of the emission surfaces, through which the different color s-polarized light beams are emitted after they enter the polarization beam splitters 413B, 413G and 413R for different color light beams and are reflected by the polarization beam splitters 413B, 413G and 413R, a light valve for B light 416B, a light valve for G light 416G and a light valve for R light 416R, are respectively provided.

Each of the light valves 416R, 416G and 416B employed in this embodiment is electric-write type reflection liquid crystal light valve and has a function of reflecting and emitting modulated light (p-polarized light) after modulating incident polarized light (s-polarized light) only at positions selected by corresponding color signals over a specific pixel area and reflecting and emitting the incident light unchanged, i.e., as s-polarized light at unselected positions.

The light beams that have been emitted from the light valves 416R, 416G and 416B for different color light beams respectively enter the polarization beam splitters 413R, 413G and 413B for different color light beams again, and at the polarization splitter portions of the polarization beam splitters 413B, 413G and 413R, only the modulated light is transmitted to be detected and then emitted, whereas unmodulated light is reflected to be ultimately discarded. The polarization beam splitters 413B, 413G and 413R constitute a detecting optical system that detects modulated light among light emitted from the light valves 416R, 416G and 416B for different color light beams. Then the detected different color light beams are made to enter, through different entry surfaces, a cross dichroic prism 418 constituting a composition optical system where color composition is implemented.

The cross dichroic prism 418 is a prism constituted by internally providing a B light reflection dichroic film 418B and an R light reflection dichroic film 418R orthogonally to each other, and the detected light beams that have entered the prism 418, i.e., the R light and the B light, are respectively reflected by the dichroic film 418 R and the dichroic film 418B to change their optical axes by 90 degrees, and advance in the same direction to be emitted from the prism 418.

The detected G light, on the other hand, is transmitted and advances through the two dichroic films 418B and 418R unchanged, and with the G light advancing and being emitted with its optical axis extending in the same direction as that of the R light and the B light, color composition of the R, G and B light beams is achieved.

The composite light enters a projection lens 419 constituting a projection optical system and is projected as a full-color image on a screen (not shown).

This completes the explanation of the structure of the projection type display apparatus in the fourth embodiment.

Figure 12:
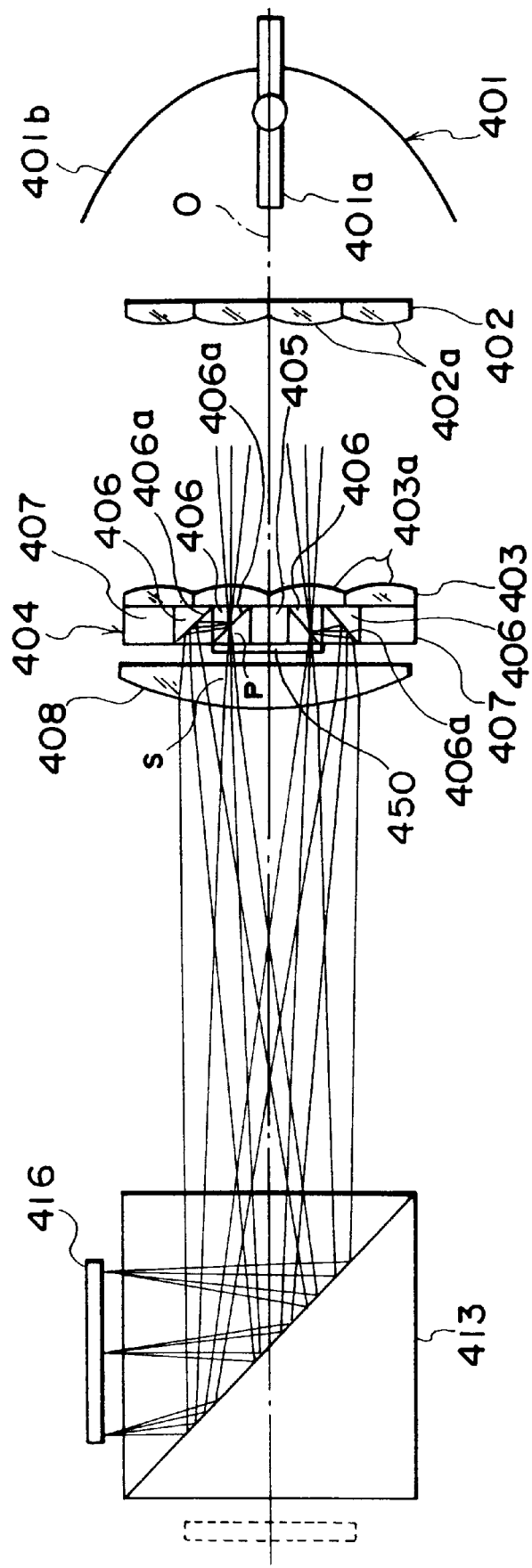
FIG. 12 is a diagram of light beams illustrating the illumination of the light valve achieved by employing the polarization device in the fourth embodiment.
Figure 13:
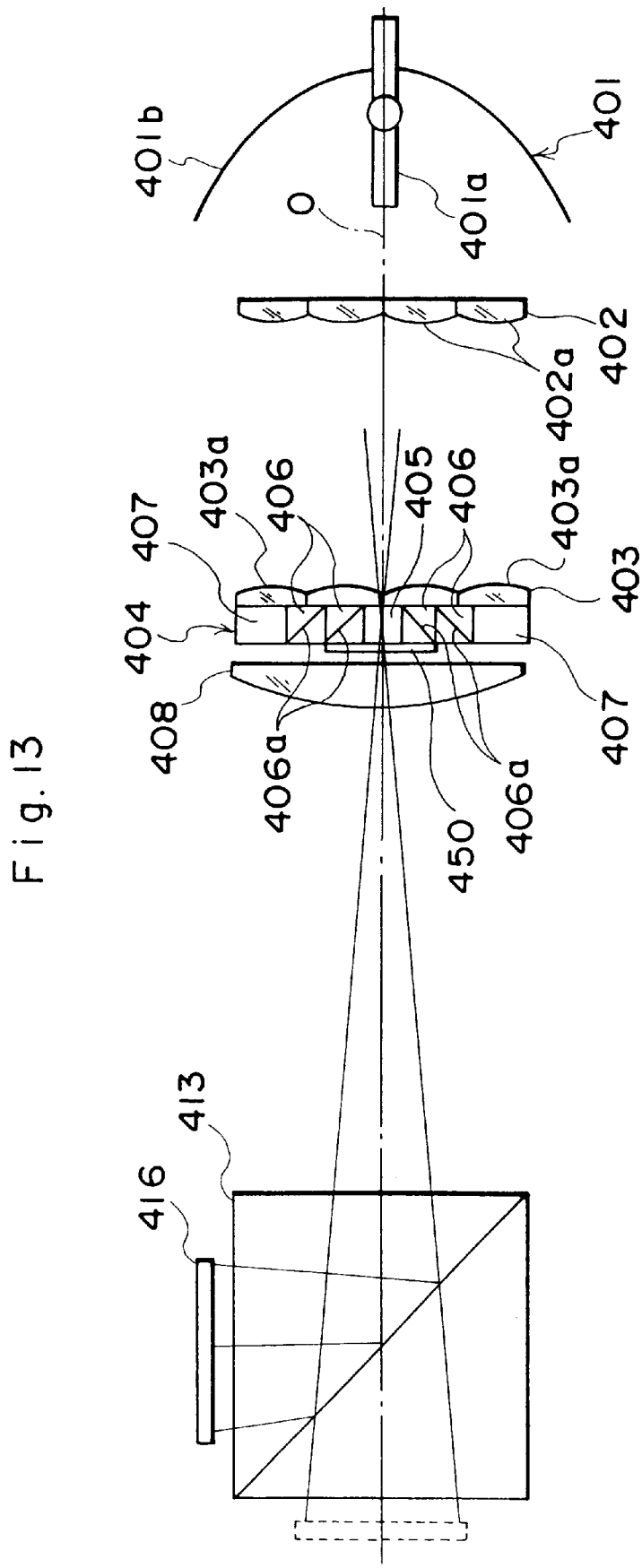
FIG. 13 is another diagram of light beams illustrating illumination of the light valve achieved by employing the polarization device in the fourth embodiment.
Figure 14:
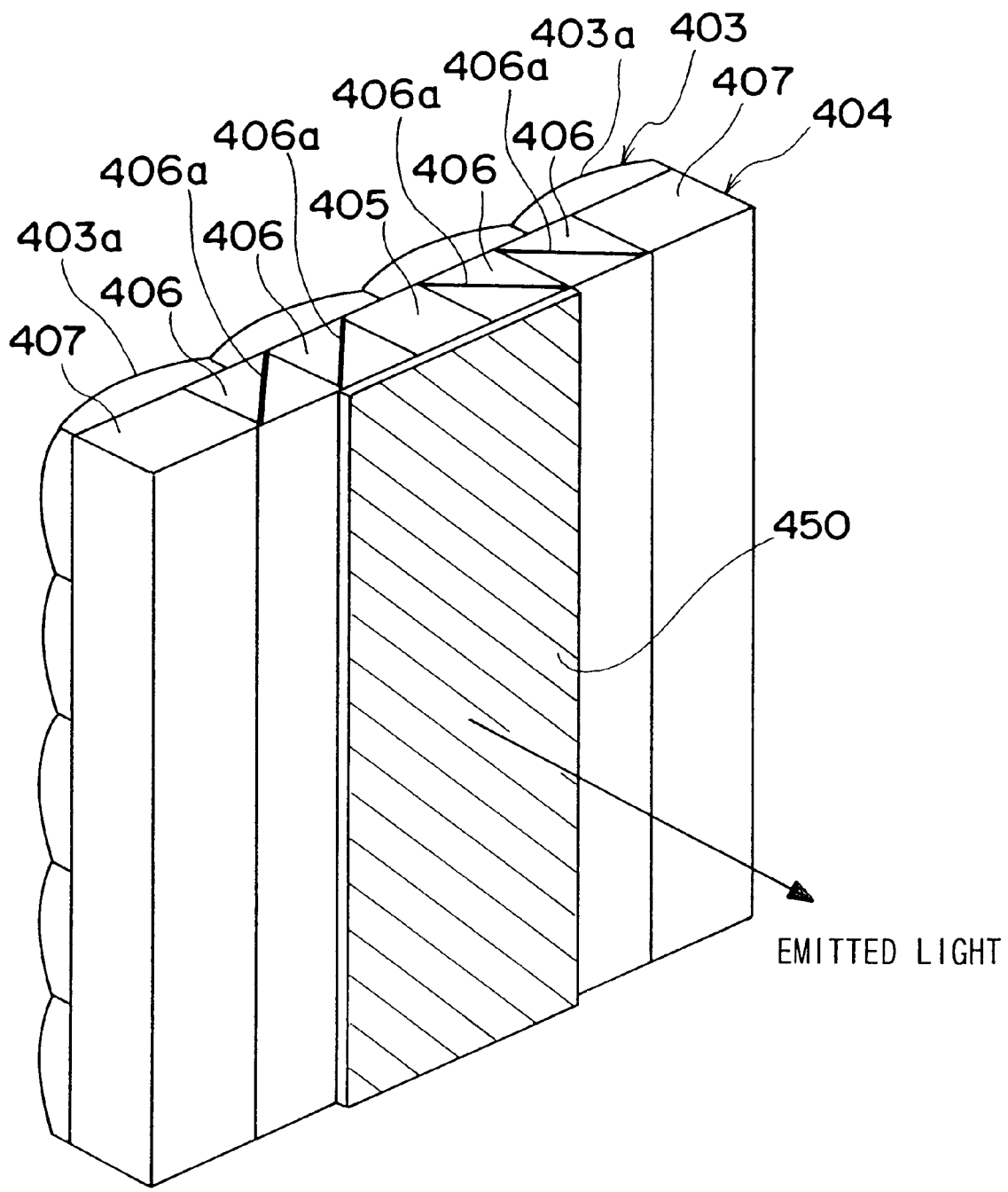
FIG. 14 is a perspective of the prism array provided with halfwave plates and the second lens plate employed in the polarization device in the fourth embodiment.

Now, the polarization device in the fourth embodiment is explained in further detail in reference to FIGS. 12–14.

FIG. 14 is a perspective of the second lens plate 403, the prism array 404 and the halfwave plate 450 in the polarization device in the fourth embodiment viewed from the side where the emission surfaces of these members are present.

The lenses 403a of the second lens plate 403 have the 4 across ×5 down arrangement as explained earlier, and at the side where the emission surface of the lens plate 403 is present, the prism array 404 having the first glass rod 405 formed in a columnar shape with a square cross section extending along the longitudinal direction, the PBS's 406 having a shape identical to that of the first glass rod 405 and the second glass rods 407 formed in a columnar shape with a rectangular cross section extending along the longitudinal direction is provided. In the prism array 404, which is constituted by bonding the side surfaces of the first glass rod 405, the PBS's 406 and the second glass rods 407 that are provided adjacent to each other, one second glass rod 407, two PBS's 406, one first glass rod 405, two PBS's 406 and one second glass rod 407 are provided starting at one side in this order. In addition, at each two of the PBS's 406 provided at each side of the optical axis O, a polarization splitter portion 406a is provided having an inclination at an angle of 45 degrees relative to an incident light so that s-polarized light in the incident light, which is to be reflected at the polarization splitter portion 406a, is reflected outward relative to the optical axis O.

The lateral width of the first glass rod 405 and the PBS's 406 is set to be half the lateral width of the lenses 403a of the lens plate 403, and the first glass rod 405 is provided to correspond to the position of the boundaries of the lenses 403a of the second lens plate 403 on the optical axis O, with the PBS's 406 adjacent to the first glass rod 405 on its two sides positioned to align the centers of the lenses 403a. In addition, the PBS's 406 which are adjacent to these PBS's 406 on the two sides are positioned to correspond to the positions of the boundaries of the lenses 403a. Furthermore, the second glass rods 407 are each formed to have a width which is 1.5 times the width of the PBS's 406.

The halfwave plate 450 indicated as the shaded area in FIG. 14 is bonded to the emission surface of the first glass rod 405 and the emission surface of the PBS 406 on each side of the first glass rod 405, in the central area of the emission surface of the prism array 404.

The polarization device and the projection type display apparatus in the fourth embodiment are further explained in reference to FIGS. 12 and 13.

FIGS. 12 and 13 each present a cross section of the projection type display apparatus employing the polarization device, illustrating the polarization device, the condenser lens 408, the polarization beam splitter 413 and the light valve 416 in the projection type display apparatus at the position of the optical axis O, superimposed with a diagram of light beams.

Although, for strict accuracy, the projection type display apparatus should be explained with respect to R light, G light and B light as illustrated in FIG. 11, the illustration of the color separation optical system is omitted since the lengths of the optical paths of the individual color light beams to reach the light valves 416R, 416G and 416B are the same, and in the figures, the individual light valves 416R, 416G and 416B are represented by a light valve 416 and the polarization beam splitters 413R, 413G and 413B for different color light beams are represented by a polarization beam splitter 413.

In these figures, the light source light constituted of roughly parallel light emitted from the light source unit 401 enters the first lens plate 402 as explained earlier, and is divided into a plurality of beams defined by the apertures formed by the lenses 402a (comprising 4 across ×5 down lenses) constituting the lens plate 402. The beams resulting from the division are caused to enter the lenses 403a constituting the second lens plate 403 which correspond to the individual lenses 402a. However, as described in reference to the first embodiment in the explanation of the analysis of the method in the prior art, at each of the approximately four lenses 403a around the optical axis O at the second lens plate 403, a light spot located only at the center of the lens 403a is not formed but the light spot has spread, due to the influence of the lamp 401a and the like, unlike at the peripheral area. Furthermore, the quantity of light of these light spots accounts for most of the light entering the second lens plate 403.

While a light spot with a high degree of intensity is formed over the entire surface of a lens 403a of the second lens plate 403 adjacent to the optical axis O in FIG. 12, the light emitted from the light spot corresponding to approximately the center of the lens 403a in the entire light spot enters a PBS 406 where it is allowed to be transmitted through its polarization splitter portion 406a, is converted to s-polarized light by the halfwave plate 450 provided at the emission surface of the PBS 406 and is emitted.

The s-polarized light reflected by the polarization splitter portion 406a of the PBS 406 enters an adjacent PBS 406 and is reflected at the polarization splitter portions 406 of the PBS 406. However, since no halfwave plate 450 is provided at the emission surface, it is emitted unchanged as s-polarized light.

These s-polarized light beams travel through the condenser lens 408 and enter the polarization beam splitter 413. Since the polarization splitter portion of the polarization beam splitter 413 is constituted to reflect the s-polarized light beams, the s-polarized light beams are reflected and emitted to enter the reflection type light valve 416 provided in the vicinity of the emission surface of the polarization beam splitter 413 to illuminate the light valve 416.

The light that is emitted from a light spot around the optical axis O at the second lens plate 403 (the boundary of the lenses 403a in the central area), on the other hand, enters the first glass rod 405 provided at the center of the prism array 404 which is provided nearby, as illustrated in FIG. 13. At the glass rod 405 having a square cross section, the emitted light that has entered the rod is emitted unchanged to travel through the halfwave plate 450, and since it is a random polarization light, the polarization state does not change and it is transmitted unchanged as random polarization light to be emitted. It then travels through the condenser lens 408 and enters the polarization beam splitter 413 where the p-polarized light component that has been transmitted through the polarization splitter portion is discarded and the s-polarized light that has been reflected by the polarization splitter portion is emitted to illuminate the light valve 416.

Thus, while it is not necessarily required that the halfwave plate 450 be provided at the emission surface of the first glass rod 405, since providing the halfwave plate 450 over the area that excludes this area may result in an increase in the production costs, the fourth embodiment adopts a structure in which a single halfwave plate 450 is pasted, as illustrated in FIG. 14.

Furthermore, only the p-polarized light that is transmitted through the PBS 406 in regard to the light entering the boundaries of a lens 403a adjacent to the optical axis O and an outermost lens 403a provided on the outside then entering the PBS 406 in FIG. 12, travels through the condenser lens 408 to enter the polarization beam splitter 413. But, it cannot contribute to the illuminating of the light valve 416, since it is p-polarized light.

However, since hardly any light spots are present on these lenses 403a in this area and since the quantity of light at the light spots formed at the lenses 403a adjacent to the optical axis O is absolutely larger, as explained earlier, this does not reduce the quantity of illuminating light for the light valve 416. Rather, since half of the light emitted from the light spots in the vicinity of the optical axis O can be utilized as illuminating light for the light valve 416 in the fourth embodiment, a great advantage is achieved in that projected images with a high degree of intensity can be projected by achieving illumination with a high degree of intensity for the light valve 416.

In other words, since the glass rod 405 is provided but no PBS 406 is provided at the area corresponding to the light spots in the vicinity of optical axis O (in the central area of prism array 404), the light emitted from the light spot does not undergo the process of polarization splitting to become polarized light most of which is not, ultimately, utilized. Namely, random light, at least half of which is utilized as illuminating light, is emitted unchanged from the glass rod 405. Thus, the advantage described above is achieved.

Fifth Embodiment

Figure 15:
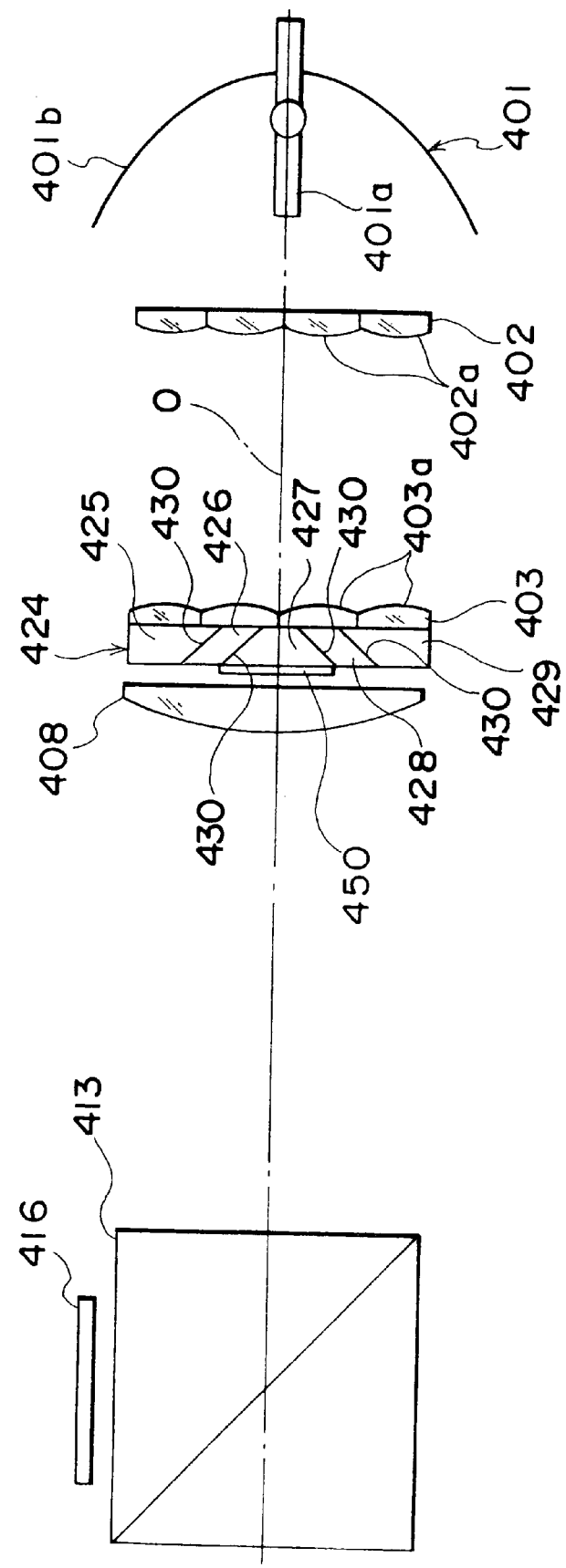
FIG. 15 illustrates illumination of the light valve by employing the prism array provided with halfwave plates in the polarization device in a fifth embodiment.
Figure 16:
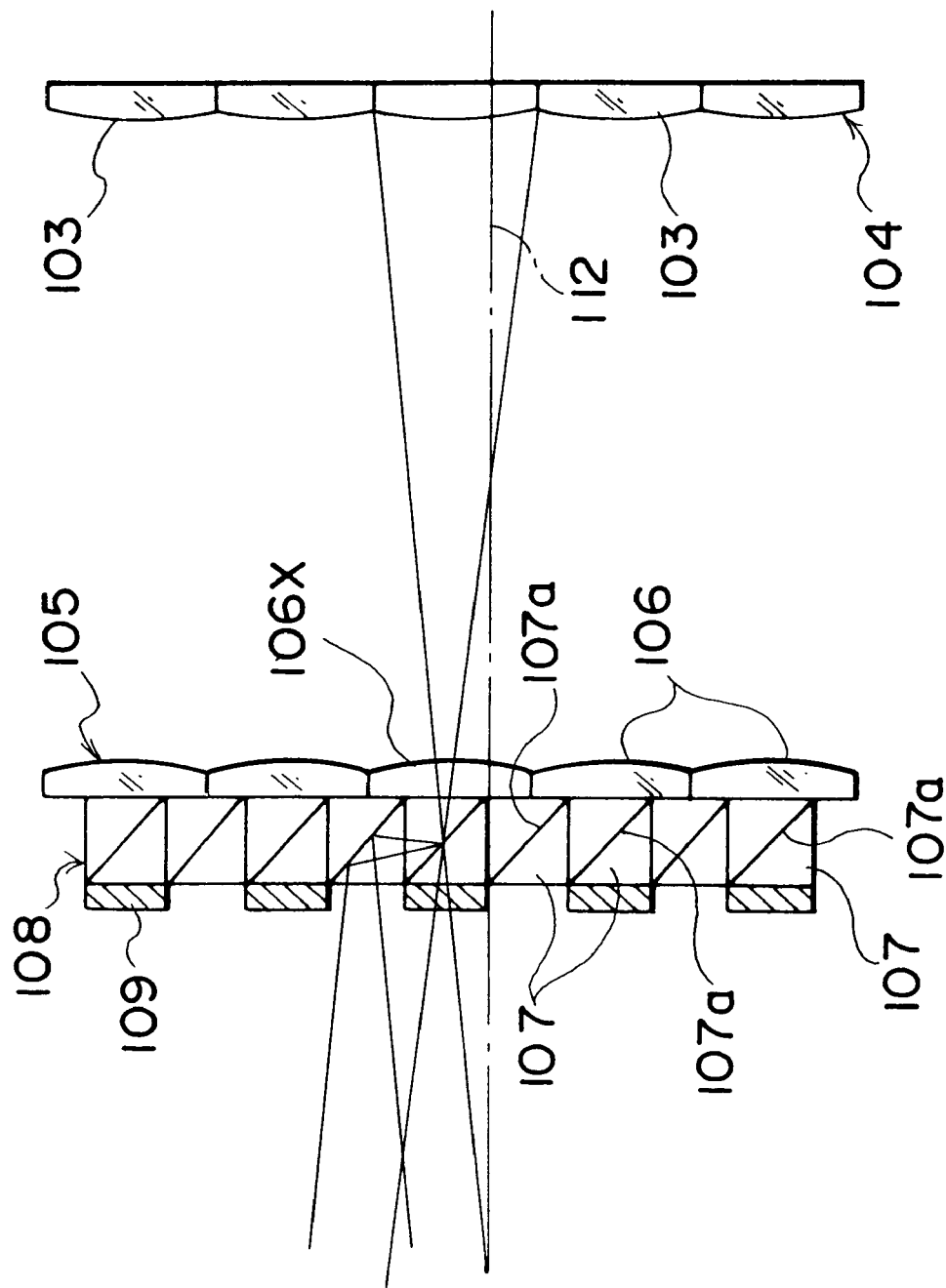
FIG. 16 is an enlargement of the essential portion of a polarization illumination system given as an example of prior art technology.
Figure 17:
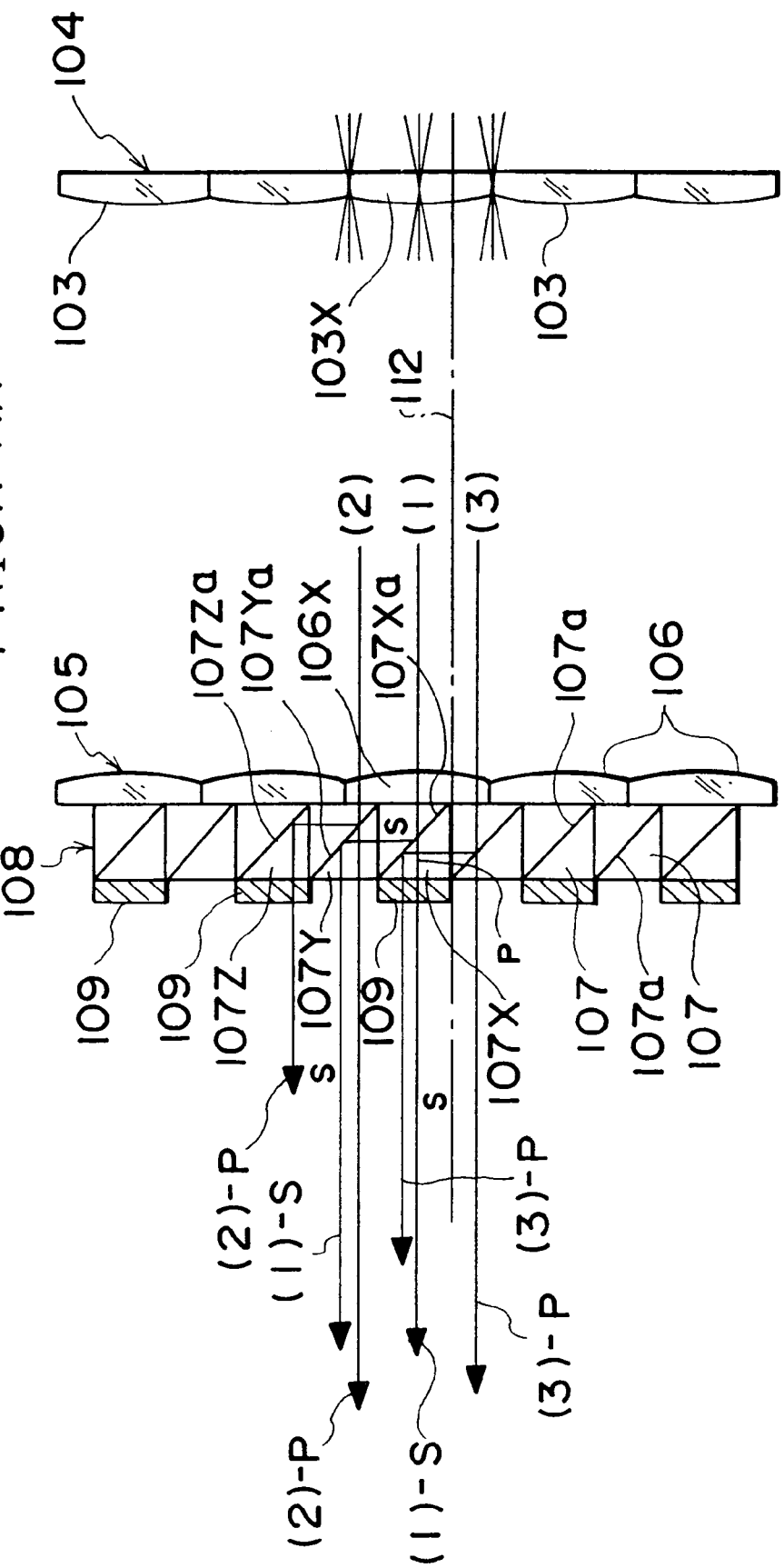
FIG. 17 illustrates the problems arising at the essential portion of the polarization illumination system in the prior art above.
Figure 18:
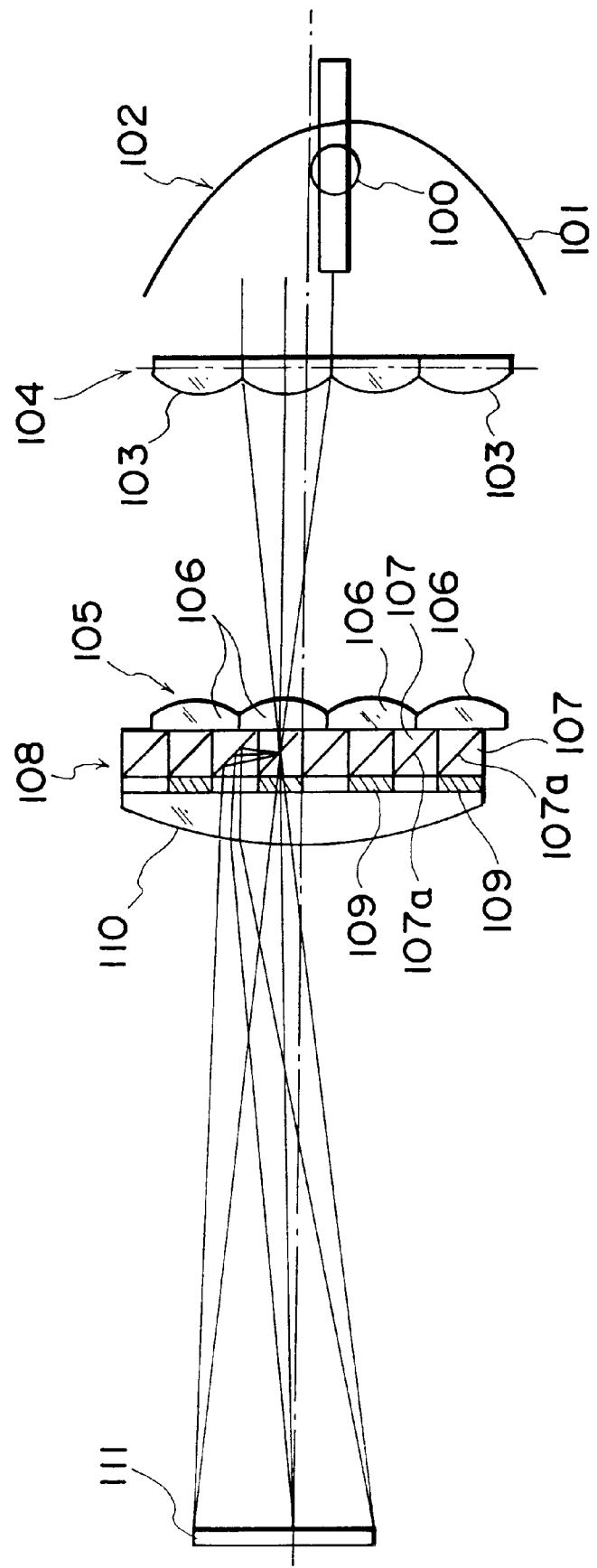
FIG. 18 is an overall configuration diagram illustrating the polarization illumination system in the prior art above.

FIG. 15 is a configuration diagram of the projection type display apparatus in the fifth embodiment.

The fifth embodiment differs from the polarization device in the fourth embodiment illustrated in FIGS. 11–14 in that, while the fourth embodiment adopts a structure in which the prism array 404 is constituted by pasting the first glass rod and the PBS's 406 both having square cross sections, and the rectangular second glass rods 407 in a planar configuration, a prism array 424 having a different shape is employed in the fifth embodiment to fulfill essentially the same functions as those realized in the fourth embodiment. It is to be noted that in the figure, the same reference numbers are assigned to components identical to those in the fourth embodiment.

The prism array 424 is provided with five prisms 425, 426, 427, 428 and 429, with a polarization splitter film 430 provided between the prisms 425 and 426, between the prisms 426 and 427, between the prisms 427 and 428 and between the prisms 428 and 429.

To explain in further detail, the prisms 425 and 429 provided on the two sides of the prism array 424 are shaped in a trapezoidal shape having a cross section achieved by essentially combining the second glass rod 407 and the triangular prism on one side formed by separating a PBS 406 from its polarization splitter portion 406a in the fourth embodiment.

In addition, the prisms 426 and 428 adjacent to the prisms 425 and 429 respectively toward the inside, have the same thickness as the prisms 425 and 429 with a parallelogram cross section. They are formed in a shape that is essentially the same as the shape achieved by combining and bonding the two triangular prisms of the two bonded PBS's 406 in the fourth embodiment.

Furthermore, the central prism 427 provided on the optical axis O has a trapezoidal cross section, and is formed in a shape which is essentially the same as the shape achieved by combining the first glass rod 405 and the triangular prism on one side of the PBS's 406 bonded onto its two sides in the fourth embodiment.

The prism array 424 in the fifth embodiment is arranged in a planar configuration by bonding the five prisms 425, 426, 427, 428 and 429 with an adhesive after forming a polarization splitter film 430 at one of the inclining surfaces of each of the prisms.

As in the fourth embodiment, the halfwave plate 450 is provided over the entire emission surface of the prism 427.

By employing the prism array 424 in the fifth embodiment, advantages similar to those achieved in the fourth embodiment are achieved to realize illumination of the light valve 416 with a high degree of intensity and provide a projection type display apparatus capable of projecting a projected image with a high degree of intensity.

In the fifth embodiment, which employs the prism array 424 having a different shape, the portion of the central prism 427 corresponding to the first glass rod 405 in the fourth embodiment constitutes an essential (or substantial) glass rod as referred to in the scope of patent claims. In addition, the portions (triangular portions) on either side of the prism 427, the prisms 426 and 428, the portions (triangular portions) of the prisms 425 and 429 toward the inside and the polarization splitter portion 430 correspond to the PBS's 406 in the fourth embodiment and constitute the "polarization beam splitter essentially (or substantially) provided with a polarization splitter portion" as referred to in the scope of patent claims.

While the polarization devices in the fourth embodiment and the fifth embodiment adopt a structure in which the illuminating light for the light valve 416 is constituted of the s-polarized light that enters the light valve 416 after being reflected at the polarization splitter portion of the polarization beam splitter 413 in the projection type display apparatus employing these polarization devices, a structure in which the light valve 416 is illuminated with p-polarized light that has been transmitted through the polarization splitter portion may be adopted instead. In that case, it is necessary to constitute the polarization device in such a manner that most of polarized light emitted from it is p-polarized light, and this may be achieved by providing the halfwave plate 450 at a position where it is not provided in the embodiments presented above.

In this case, the halfwave plate 450 may be provided only at the emission surfaces of the PBS's 406 which are located on boundaries of lenses 403a. The halfwave plate 450 is not provided on the emission surface of the glass rod 405. In other words, two of the halfwave plate 450 may be provided respectively on the emission surfaces of two outer PBS's which are currently not provided with the halfwave plates 450 in FIG. 14.

In addition, in the fourth and fifth embodiments, 4 across ×5 down lens 403a are formed to constitute the second lens plate 403 in the polarization device, with the area of high intensity formed over 2×2 lenses 403a near the optical axis O. This high intensity area is not dependent upon the sizes and positions of the lenses 402a and 403a of the first lens plate 403 and the second lens plate 403, and if the numbers of the lenses 402a and 403a of the first lens plate 402 and the second lens plate 403 are increased, for instance, the number of lenses 403a contained in the high intensity area will also increase to result in an increase in the required number of PBS's 406 constituting the prism array 424. However, the size of the high intensity area does not essentially change greatly at the second lens plate 403. It goes without saying that because of this, the number of first glass rods 405 constituting the prism array 404 or 424, the size of the prisms 425 and 429 and the like change accordingly.

Furthermore, while the explanation has been given on examples in which the polarization devices in the fourth and fifth embodiments are employed in the projection type display apparatus illustrated in FIG. 11, it goes without saying that the polarization device according to the present invention may be adopted in projection type display apparatuses other than the projection type display apparatus structured as described earlier.

Moreover, the color separation optical system may be structured in such a manner that B light and R light are reflected and color-separated towards opposite sides from each other by a cross dichroic mirror and that G light advances after being transmitted through the cross dichroic mirror. Or, the color separation optical system may adopt another structure. In addition, the light valve 416 to be employed in the apparatus is not restricted to being the reflection type and a transmission type light valve may be used instead.

What is claimed is:

1. A polarization device comprising:
   a light source;
   a first lens plate including a plurality of lenses in a planar configuration that divides light emitted from said light source into beams defined by apertures of said plurality of lenses;
   a second lens plate which is different from said first plate and includes a plurality of lenses in a planar configuration, said plurality of lenses of said first lens plate individually forming light spots at said plurality of lenses of said second lens plate;
   a polarization beam splitter array constituted of a plurality of polarization beam splitters provided continuously, that performs polarization splitting of light that has been emitted from said light spots of said plurality of lenses of said second lens plate and has entered therein to split the light into p-polarized light and s-polarized light, and emits the split light; and
   halfwave plates provided at an emission surface of said polarization beam splitter array that convert polarized light emitted from said polarization beam splitter array either from p-polarized light to s-polarized light or from s-polarized light to p-polarized light, wherein
   said halfwave plates are provided at said emission surface of said polarization beam splitter array, in different arrangements between a central area of said polarization beam splitter array and a peripheral area excluding said central area.

2. A polarization device according to claim 1, wherein each of said halfwave plates is provided at every other polarization beam splitter at said emission surface of said polarization beam splitter array in different arrangements between said central area of said polarization beam splitter array and said peripheral area.

3. A polarization device according to claim 1, wherein said halfwave plate are provided over an entire surface ranging over a plurality of emission surfaces of said polarization beam splitters in said central area of said emission surface of said polarization beam splitter array.

4. A polarization device according to claim 1, wherein no said halfwave plate is provided over an entire surface ranging over a plurality of emission surfaces of said polarization beam splitters in said central area of said emission surface of said polarization beam splitter array.

5. A polarization device comprising:
   a light source;
   a first lens plate including a plurality of lenses in a planar configuration that divides light emitted from said light source into beams defined by apertures of said plurality of lenses;
   a second lens plate which is different from said first plate and includes a plurality of lenses in a planar configuration, said plurality of lenses of said first lens plate individually forming light spots at said plurality of lenses of said second lens plate;
   a polarization beam splitter array constituted of a plurality of polarization beam splitters provided continuously, that performs polarization splitting of light that has been emitted from said light spots of said plurality of lenses of said second lens plate and has entered therein to split the light into a first polarized light that transmits through polarization splitter portions of said polarization beam splitters and a second polarized light that (1) is reflected at said polarization splitter portions, (2) enters adjacent polarization beam splitters, and (3) is emitted at polarization splitter portions of said adjacent polarization beam splitters in a direction matching the direction of said first polarized light; and
   halfwave plates provided at an emission surface of said polarization beam splitter array that convert polarized light emitted from said polarization beam splitter array either from said first polarized light to said second polarized light or from said second polarized light to said first polarized light, wherein
   said halfwave plates are provided at said emission surface of said polarization beam splitter array, in different arrangements between a central area of said polarization beam splitter array and a peripheral area excluding said central area.

6. A polarization device according to claim 5, wherein each of said halfwave plate is provided at every other polarization beam splitter at said emission surface of said polarization beam splitter array in different arrangements between said central area of said polarization beam splitter array and said peripheral area.

7. A polarization device according to claim 5, wherein said halfwave plates are provided over an entire surface ranging over a plurality of emission surfaces of said polarization beam splitters in said central area of said emission surface of said polarization beam splitter array.

8. A polarization device according to claim 5, wherein no said halfwave plate is provided over an entire surface ranging over a plurality of emission surfaces of said polarization beam splitters in said central area of said emission surface of said polarization beam splitter array.

9. A projection type display apparatus comprising:

a polarization device;

a color separation optical system that separates p-polarized light or s-polarized light emitted from said polarization device into R light, G light and B light;

light valves that are provided for said R light, G light and B light, modulate said separated R light, G light and B light with signals corresponding to said R light, G light and B light, and then emit modulated light, respectively;

a detecting optical system that detects said modulated light from light emitted from said light valves;

a composition optical system that performs color composition of detected light of said R light, G light and B light that has been detected at said detecting optical system; and a projection optical system that projects composite light obtained by said composition optical system, wherein said polarization device comprises:

a light source;

a first lens plate including a plurality of lenses in a planar configuration that divides light emitted from said light source into beams defined by apertures of said plurality of lenses;

a second lens plate which is different from said first plate and includes a plurality of lenses in a planar configuration, said plurality of lenses of said first lens plate individually forming light spots at said plurality of lenses of said second lens plate;

a polarization beam splitter array constituted of a plurality of polarization beam splitters provided continuously, that performs polarization splitting of light that has been emitted from said light spots of said plurality of lenses of said second lens plate and has entered therein to split the light into p-polarized light and s-polarized light, and emits the split light; and halfwave plates provided at an emission surface of said polarization beam splitter array that convert polarized light emitted from said polarization beam splitter array either from p-polarized light to s-polarized light or from s-polarized light to p-polarized light, and wherein said halfwave plates are provided at said emission surface of said polarization beam splitter array, in different arrangements between a central area of said polarization beam splitter array and a peripheral area excluding said central area.

10. A projection type display apparatus according to claim 9, wherein each of said halfwave plate is provided at every other polarization beam splitter at said emission surface of said polarization beam splitter array in different arrangements between said central area of said polarization beam splitter array and said peripheral area.

11. A projection type display apparatus according to claim 9, wherein said halfwave plates are provided over an entire surface ranging over a plurality of emission surfaces of said polarization beam splitters in said central area of said emission surface of said polarization beam splitter array.

12. A projection type display apparatus according to claim 9, wherein no said halfwave plate is provided over an entire surface ranging over a plurality of emission surfaces of said polarization beam splitters in said central area of said emission surface of said polarization beam splitter array.

13. A projection type display apparatus comprising:

a polarization device;

a color separation optical system that separates first polarized light or second polarized light emitted from said polarization device into R light, G light and B light;

light valves that are provided for said R light, G light and B light, modulate said separated R light, G light and B light with signals corresponding to said R light, G light and B light, and then emit modulated light, respectively;

a detecting optical system that detects said modulated light from light emitted from said light valves;

a composition optical system that performs color composition of detected light of said R light, G light and B light that has been detected at said detecting optical system; and a projection optical system that projects composite light obtained by said composition optical system, wherein said polarization device comprises:

a light source;

a first lens plate including a plurality of lenses in a planar configuration that divides light emitted from said light source into beams defined by apertures of said plurality of lenses;

a second lens plate which is different from said first plate and includes a plurality of lenses in a planar configuration, said plurality of lenses of said first lens plate individually forming light spots at said plurality of lenses of said second lens plate;

a polarization beam splitter array constituted of a plurality of polarization beam splitters provided continuously, that performs polarization splitting of light that has been emitted from said light spots of said plurality of lenses of said second lens plate and has entered therein to split the light into a first polarized light that transmits through polarization splitter portions of said polarization beam splitters and a second polarized light that (1) is reflected at said polarization splitter portions, (2) enters adjacent polarization beam splitters, and (3) is emitted at polarization splitter portions of said adjacent polarization beam splitters in a direction matching the direction of said first polarized light; and halfwave plates provided at an emission surface of said polarization beam splitter array that convert polarized light emitted from said polarization beam splitter array either from said first polarized light to said second polarized light or from said second polarized light to said first polarized light, and wherein said halfwave plates are provided at said emission surface of said polarization beam splitter array, in different arrangements between a central area of said polarization beam splitter array and a peripheral area excluding said central area.

14. A projection type display apparatus according to claim 13, wherein each of said halfwave plates is provided at every other polarization beam splitter at said emission surface of said polarization beam splitter array in different arrangements between said central area of said polarization beam splitter array and said peripheral area.

15. A projection type display apparatus according to claim 13, wherein said halfwave plates are provided over an entire surface ranging over a plurality of emission surfaces of said polarization beam splitters in said central area of said emission surface of said polarization beam splitter array.

16. A projection type display apparatus according to claim 13, wherein no said halfwave plate is provided over an entire surface ranging over a plurality of emission surfaces of said polarization beam splitters in said central area of said emission surface of said polarization beam splitter array.

17. A polarization device comprising:

a light source;

a first lens plate including a plurality of lenses in a planar configuration that divides light emitted from said light source into beams defined by apertures of said plurality of lenses;

a second lens plate which is different from said first plate and includes a plurality of lenses in a planar configuration, said plurality of lenses of said first lens plate individually forming light spots at said plurality of lenses of said second lens plate;

a polarization beam splitter array comprising a plurality of polarization beam splitters, wherein said polarization beam splitter array performs polarization splitting of light that has been emitted from said light spots of said plurality of lenses of said second lens plate and has entered therein to split the light into p-polarized light and s-polarized light, and emits the split light; and halfwave plates provided at an emission surface of said polarization beam splitter array that convert polarized light emitted from said polarization beam splitter array either from p-polarized light to s-polarized light or from s-polarized light to p-polarized light, wherein the polarization beam splitters of said polarization beam splitter array and said halfwave plates are provided in different arrangements between a central area of said polarization beam splitter array and a peripheral area excluding said central area.

* * * * *